(12) United States Patent
Okuno et al.

(10) Patent No.: US 11,122,634 B2
(45) Date of Patent: Sep. 14, 2021

(54) WIRELESS COMMUNICATION SYSTEM

(71) Applicant: Mitsubishi Electric Corporation, Tokyo (JP)

(72) Inventors: Tomoki Okuno, Tokyo (JP); Shuichi Tatei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 16/335,327

(22) PCT Filed: Sep. 6, 2017

(86) PCT No.: PCT/JP2017/032096
§ 371 (c)(1),
(2) Date: Mar. 21, 2019

(87) PCT Pub. No.: WO2018/127993
PCT Pub. Date: Jul. 12, 2018

(65) Prior Publication Data
US 2019/0320472 A1     Oct. 17, 2019

(30) Foreign Application Priority Data

Jan. 5, 2017  (WO) .................. PCT/JP2017/000141

(51) Int. Cl.
*H04W 76/10* (2018.01)
*H04W 24/08* (2009.01)
*H04B 17/318* (2015.01)

(52) U.S. Cl.
CPC .......... *H04W 76/10* (2018.02); *H04B 17/318* (2015.01); *H04W 24/08* (2013.01)

(58) Field of Classification Search
CPC .. H04B 10/54; H04B 17/318; H04N 5/23203; H04W 8/005; H04L 12/282; H04H 20/22
See application file for complete search history.

(56) References Cited

U.S. PATENT DOCUMENTS

| 10,345,767 | B2* | 7/2019 | Li ........................... G05B 15/02 |
| 2002/0054154 | A1 | 5/2002 | Fukuda et al. |
| 2003/0060975 | A1* | 3/2003 | Fukushima ........ G08G 1/09685 701/420 |
| 2008/0194205 | A1* | 8/2008 | Kusakari .............. H04B 17/318 455/67.7 |
| 2009/0051823 | A1* | 2/2009 | Tsurumoto ............. G08C 17/00 348/734 |

(Continued)

FOREIGN PATENT DOCUMENTS

| CN | 103916475 A | 7/2014 |
| EP | 3 054 714 A1 | 8/2016 |

(Continued)

OTHER PUBLICATIONS

Office Action dated Jul. 2, 2020 issued in corresponding CN patent application No. 201780079672.8 (and English translation).

(Continued)

*Primary Examiner* — Romani Ohri
(74) *Attorney, Agent, or Firm* — Posz Law Group, PLC

(57) ABSTRACT

A wireless communication system includes a plurality of wireless communication devices each including a display unit, and an information terminal device that performs wireless communication with each of the plurality of wireless communication devices. The information terminal device includes a field intensity calculation unit that determines a field intensity of each of the plurality of wireless communication devices, and a communication device selection unit that selects at least one wireless communication device based on each field intensity determined by the field intensity calculation unit. The information terminal device includes a terminal display unit that displays identification information of the at least one wireless communication device selected by the communication device selection unit, a terminal input unit that specifies one wireless communication device based on the identification information displayed on the terminal display unit, and a terminal wireless communication unit that performs data communication with the wireless communication device.

21 Claims, 21 Drawing Sheets

(56) References Cited

U.S. PATENT DOCUMENTS

2013/0165047 A1    6/2013  Suzuki
2017/0084143 A1*  3/2017  Acera .................. H04L 12/282
2017/0111766 A1*  4/2017  Muramatsu .......... H04W 64/00

FOREIGN PATENT DOCUMENTS

| JP | 2000-125373 A | 4/2000 |
| --- | --- | --- |
| JP | 2002-112367 A | 4/2002 |
| JP | 2003-259466 A | 9/2003 |
| JP | 2008-205780 A | 9/2008 |
| JP | 2009-049916 A | 3/2009 |
| JP | 2010-199832 A | 9/2010 |
| JP | 2011-182329 A | 9/2011 |
| JP | 2012-074823 A | 4/2012 |
| JP | 5016713 B2 | 9/2012 |
| JP | 2014-150543 A | 8/2014 |
| JP | 2015-002543 A | 1/2015 |

OTHER PUBLICATIONS

Extended European Search Report dated Sep. 20, 2019 issued in corresponding EP patent application No. 17889658.5.
International Search Report of the International Searching Authority dated Nov. 28, 2017 for the corresponding international application No. PCT/JP2017/032096 (and English translation).
Office Action dated Jan. 13, 2021 issued in corresponding CN patent application No. 201780079672.8 (and English translation).

* cited by examiner

FIG. 21
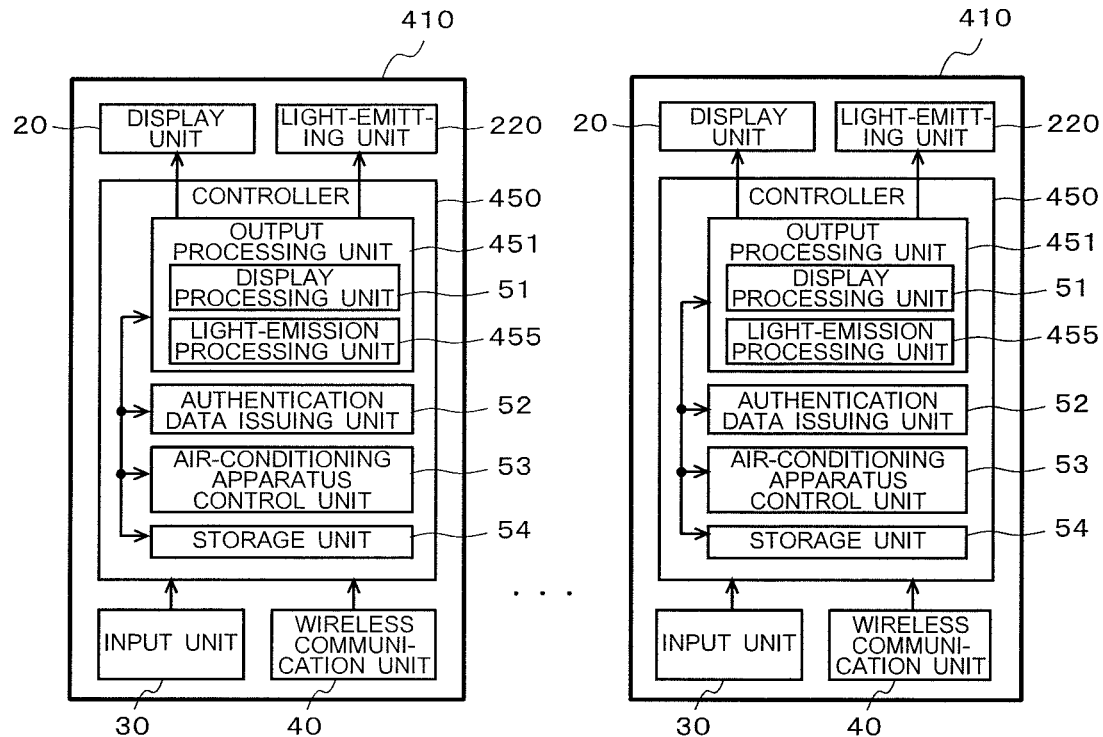
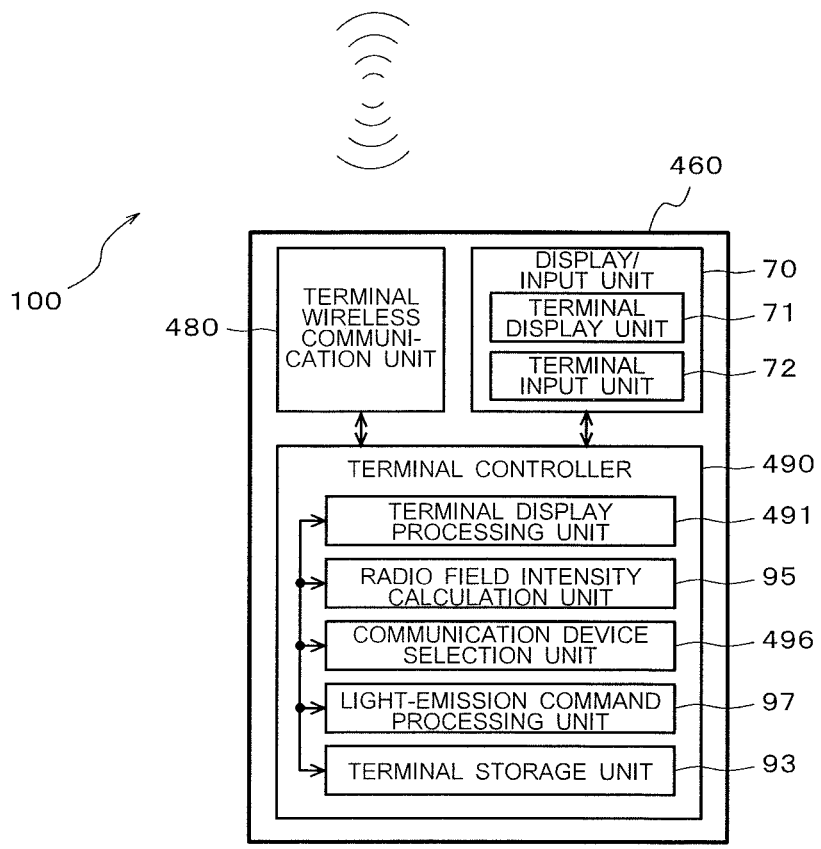

WIRELESS COMMUNICATION SYSTEM

CROSS REFERENCE TO RELATED APPLICATION

This application is a U.S. national stage application of International Application No. PCT/JP2017/032096, filed on Sep. 6, 2017, which claims priority to International Application No. PCT/JP2017/000141, filed on Jan. 5, 2017, the contents of which are incorporated herein by reference.

TECHNICAL FIELD

The present invention relates to a wireless communication system including a plurality of devices each configured to perform wireless communication.

BACKGROUND

To establish wireless communication between an information terminal device such as a smartphone and a wireless communication device such as a remote control, a user has to first perform a connection process between the information terminal device and the wireless communication device. The connection process is carried out by setting the wireless communication device that is a connection target in a searchable state, and operating the information terminal device to perform a search for the wireless communication device. A connection counterpart of the information terminal device is specified by the connection process, and a connected state where wireless communication may be performed is thereby established.

In the case where a plurality of wireless communication devices that are in a searchable state are present within a searchable range of the information terminal device, a list of the wireless communication devices is displayed on a display unit of the information terminal device. When a user specifies a desired connection counterpart from the plurality of wireless communication devices, which are displayed in the list, mutual authentication is performed between the information terminal device and the specified wireless communication device. For example, with a wireless communication system of Patent Literature 1, an information terminal device and a wireless communication device perform mutual authentication by sharing a same link key, and a state where the information terminal device and the wireless communication device are capable of performing data communication is thus achieved.

With some conventional wireless communication systems, when a plurality of wireless communication devices are installed in adjacent areas, wireless communication devices of a same type are displayed in a list under a same name. In the case of such list display, unique names are not used, and identification of wireless communication devices is difficult. Accordingly, there is proposed a method of causing an information terminal device to display a list of device IDs that are assigned, respectively, to a plurality of wireless communication devices at a time of shipping, for example, and of enabling a user to identify a wireless communication device.

PATENT LITERATURE

Patent Literature 1: Japanese Unexamined Patent Application Publication No. 2012-74823

However, a device ID that is assigned at the time of shipping or the like is a complex character string, and moreover, each letter is required to be displayed small, and such a device ID has lower distinguishability as compared with a simple ID. A user has to check the device ID of a wireless communication device to be connected in a manual, for example, and to select the device ID from a plurality of device IDs that are displayed in a list, and such procedures are burdensome. Moreover, in the case where there are similar device IDs in the list, a user possibly performs erroneous selection.

SUMMARY

The present invention has been made to solve a problem as described above, and has its object to provide a wireless communication system capable of realizing swift data communication without requiring a user to perform a burdensome operation.

A wireless communication system of an embodiment of the present invention Includes a plurality of wireless communication devices each including a display unit; and an information terminal device configured to perform wireless communication with each of the plurality of wireless communication devices, wherein the information terminal device includes a field intensity calculation unit configured to determine a field intensity of each of the plurality of wireless communication devices, a communication device selection unit configured to select at least one wireless communication device of the plurality of wireless communication devices based on each field intensity determined by the field intensity calculation unit, a terminal display unit configured to display identification information of the at least one wireless communication device selected by the communication device selection unit, a terminal input unit configured to specify one wireless communication device based on identification information displayed on the terminal display unit, and a terminal wireless communication unit configured to perform data communication with the wireless communication device specified on the terminal input unit.

According to an embodiment of the present invention, a wireless communication device is selected based on a field intensity, and thus, operation for a user may be facilitated, and swift data communication may be realized without requiring a user to perform a burdensome operation.

BRIEF DESCRIPTION OF DRAWINGS

FIG. 21 is a block diagram showing a functional configuration of the wireless communication system according to Modification 6-2 of Embodiment 6 of the present invention.

DETAILED DESCRIPTION

Embodiment 1

Figure 1:
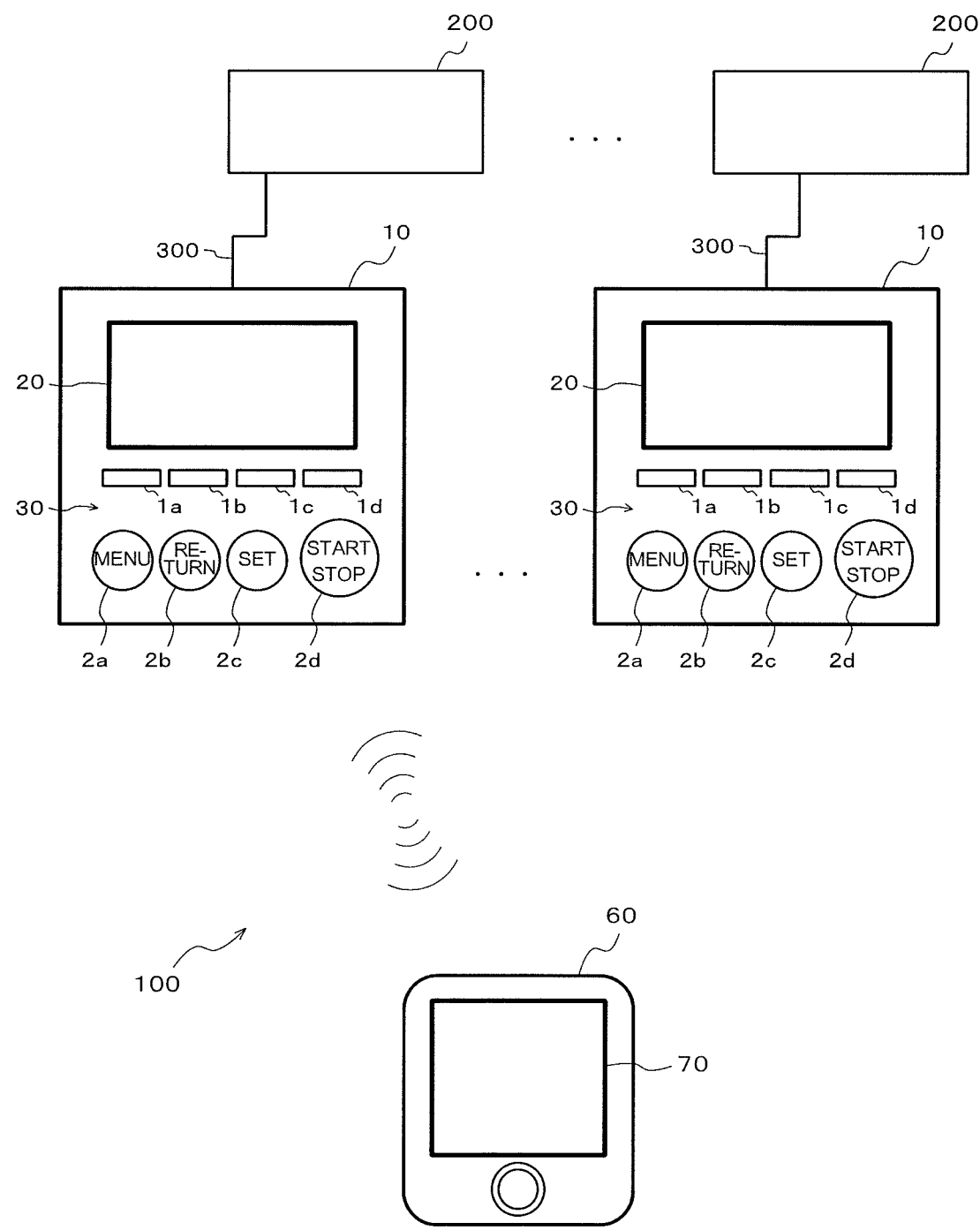
FIG. 1 is a schematic diagram showing a configuration of a wireless communication system according to Embodiment 1 of the present invention.

FIG. 1 is a schematic diagram showing a configuration of a wireless communication system according to Embodiment 1 of the present invention. As shown in FIG. 1, a wireless communication system 100 includes a plurality of wireless communication devices 10, and an information terminal device 60. In Embodiment 1, the plurality of wireless communication devices 10 are each a remote control configured to operate a corresponding air-conditioning apparatus 200. In FIG. 1, the plurality of wireless communication devices 10 are each connected to the corresponding air-conditioning apparatus 200 by a transmission line 300. The plurality of wireless communication devices 10 may thus each monitor the corresponding air-conditioning apparatus 200.

The plurality of wireless communication devices 10 each have a same configuration, and the plurality of air-conditioning apparatus 200 have a same configuration. Accordingly, in the following, the configuration of one wireless communication device 10 and the configuration of one air-conditioning apparatus 200 will be specifically described.

The wireless communication device 10 and the information terminal device 60 are configured to perform wireless communication by arbitrary communication standards including Bluetooth (registered trademark; the same applies below), a wireless LAN such as WiFi (registered trademark; the same applies below), and ZigBee (registered trademark; the same applies below). Additionally, Bluetooth Low Energy (BLE) is included in Bluetooth.

The wireless communication device 10 manages an operation state of the air-conditioning apparatus 200, and is installed on a wall of a space to be air-conditioned where the air-conditioning apparatus 200 is installed, for example. The wireless communication device 10 includes a display unit 20 and an input unit 30. For example, the display unit 20 is a liquid crystal display (LCD), and displays information on an operation on the air-conditioning apparatus 200, an operation state of the air-conditioning apparatus 200, and a state of air in the air-conditioned space.

The input unit 30 receives an input operation of a user, and transmits a signal according to contents of the input operation to a controller 50, described later. In Embodiment 1, the wireless communication device 10 includes, as the input unit 30, a plurality of function keys 1a to 1d that are assigned with various functions according to a display state of the display unit 20, and a plurality of fixed keys 2a to 2d to which specific functions are fixedly assigned.

The plurality of function keys 1a to 1d are assigned with a function of receiving change of setting of wind velocity, a function of receiving change of a set temperature, a function of receiving change of an operation mode, and other functions. When the fixed key 2a on which "menu" is shown is pressed by a user, the input unit 30 transmits a signal indicating transition to a menu screen to the controller 50. When the fixed key 2b on which "return" is shown is pressed by the user, the input unit 30 transmits a signal indicating transition to an immediately preceding screen to the controller 50. When the user performs an input operation by using a function key among the plurality of function keys 1a to 1d, for example, and presses the fixed key 2c on which "set" is shown, the input unit 30 transmits a signal indicating contents set by the user to the controller 50. When the fixed key 2d on which "start/stop" is shown is pressed by the user, the input unit 30 transmits a signal indicating operation stop or operation start to the controller 50. Additionally, the number of function keys and fixed keys, an arrangement and shapes of the keys, and the like on the input unit 30 are not limited to the example shown in FIG. 1, and may be arbitrarily changed.

The information terminal device 60 is configured to perform wireless communication with each of the plurality of wireless communication devices 10. For example, the information terminal device 60 is a terminal device that can be carried by the user, such as a smartphone, a tablet personal computer (PC), or a personal digital assistant (PDA). In the following, a case will be described where the information terminal device 60 is a smartphone, and includes a display/input unit 70, which is a touch panel, for example.

The air-conditioning apparatus 200 is installed in an air-conditioned space such as a room, and adjusts a temperature, moisture, cleanliness or the like of air in the air-conditioned space. The air-conditioning apparatus 200 may be a separated air-conditioning apparatus including an indoor unit and an outdoor unit that are separately provided, or may be an integrated air-conditioning apparatus combining functions of the indoor unit and the outdoor unit. Moreover, the air-conditioning apparatus 200 may be a ventilator configured to replace air in the air-conditioned space with outside air, an air purifier configured to remove dust and the like floating in the air, or a humidifier configured to humidify air in the air-conditioned space. The air-conditioning apparatus 200 corresponds to "facility equipment" of the present invention.

Figure 2:
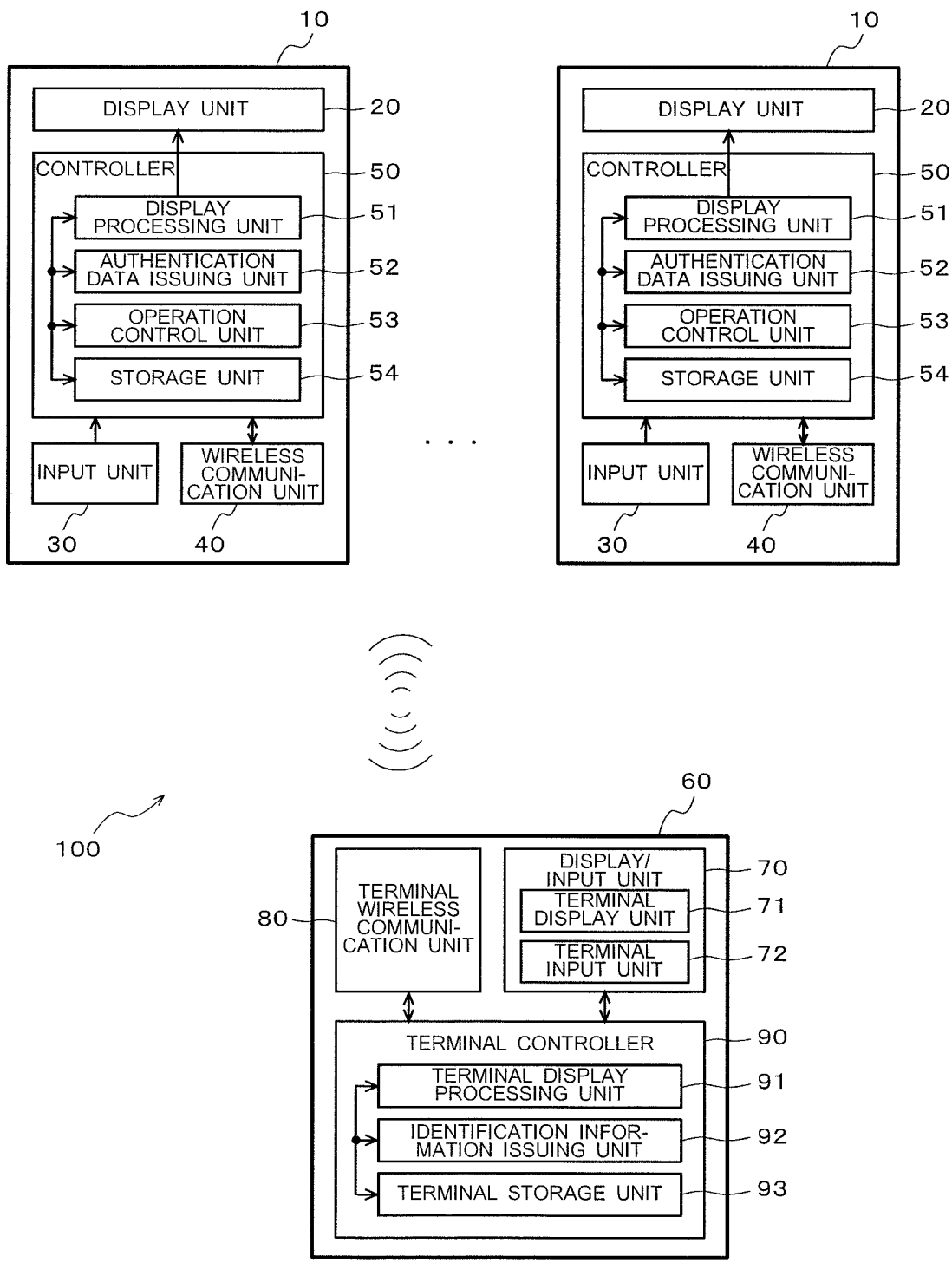
FIG. 2 is block diagram showing a functional configuration of the wireless communication system in FIG. 1.

FIG. 2 is a block diagram showing a functional configuration of the wireless communication system in FIG. 1. As shown in FIG. 2, the information terminal device 60 includes the display/input unit 70, a terminal wireless communication unit 80, and a terminal controller 90. Here, a remote operation program configured to remotely operate the air-conditioning apparatus 200 via the wireless communication device 10 by wireless communication is downloaded from an external server (not shown) over a network, and is installed in the information terminal device 60. The remote operation program is application software configured to provide the information terminal device 60 with a function of operating the air-conditioning apparatus 200.

The display/input unit 70 is a liquid crystal panel, for example, and includes a terminal display unit 71 configured to display letters, images or the like, and a terminal input unit 72 configured to receive an input operation of the user. The terminal display unit 71 displays, in a list, identification information of each of the plurality of wireless communication devices 10. The terminal display unit 71 further displays an authentication screen configured to request input of authentication data that is used for determining whether operation of the air-conditioning apparatus 200 by the information terminal device 60 is permitted or not.

The terminal input unit 72 is arranged on the top of the terminal display unit 71, and detects a position that is touched by the user, and outputs information on the detected position to the terminal controller 90. In other words, the user can perform input operation to the information terminal device 60 through an operation such as touching on a screen of the display/input unit 70. The terminal input unit 72 receives an operation specifying one of the wireless communication devices 10 based on the identification information displayed in a list on the terminal display unit 71.

More specifically, each piece of identification information displayed in a list on the terminal display unit 71 functions as a virtual key, on the terminal input unit 72, that can be operated. In other words, the user can specify one wireless communication device 10 through an operation such as touching on one piece of identification information displayed on the terminal display unit 71.

The terminal wireless communication unit 80 performs wireless communication with each of the plurality of wireless communication devices 10. The terminal wireless communication unit 80 further performs data communication with a wireless communication device 10 that is specified by the terminal input unit 72. Although not shown, the terminal wireless communication unit 80 includes a terminal communication control integrated circuit (IC) configured to perform overall control regarding wireless communication, and a terminal wireless transmission/reception circuit configured to perform transmission/reception of information.

The terminal controller 90 includes a terminal display processing unit 91, an identification information issuing unit 92, and a terminal storage unit 93. Various pieces of data such as identification information, and operation programs of the terminal controller 90 such as the remote operation program are stored in the terminal storage unit 93.

The identification information issuing unit 92 issues the identification information of each of the plurality of wireless communication devices 10. More specifically, the identification information issuing unit 92 issues, to the wireless communication device 10 to which connection can be made, identification information that is made up of a simple and unique letter or character string. For example, the identification information is a simple ID randomly including about one to three letters including at least one of alphabet letters or numbers, and is unique to each wireless communication device 10. The identification information issuing unit 92 further causes the issued identification information to be stored in the terminal storage unit 93, and transmits the issued identification information to each of the plurality of wireless communication devices 10 via the terminal wireless communication unit 80.

Here, the identification information issuing unit 92 may issue simple and unique identification information whenever a connection process is performed. Alternatively, simple and unique identification information may be stored in advance in the terminal storage unit 93, and the identification information issuing unit 92 may read the identification information from the terminal storage unit 93 whenever a connection process is performed, for example.

The terminal display processing unit 91 causes the terminal display unit 71 to display the identification information that is issued by the identification information issuing unit 92. In the case where a plurality of wireless communication devices 10 that are in a searchable state are present within a searchable range of the information terminal device 60, the identification information issuing unit 92 issues identification information for each of the plurality of wireless communication devices 10. In this case, the terminal display processing unit 91 causes the terminal display unit 71 to display the identification information of each of the plurality of wireless communication devices 10 in a list.

Furthermore, the terminal display processing unit 91 is configured to cause the terminal display unit 71 to display the authentication screen, when the user specifies one wireless communication device 10 on the terminal input unit 72 based on the identification information that is displayed in a list. The terminal display processing unit 91 is further configured to transmit authentication data input on the authentication screen, to the wireless communication device 10 specified by the user.

The terminal controller 90 here may be implemented by hardware such as a circuit device configured to implement each function described above, or may be implemented by software that is executed on an arithmetic device such as a microcomputer, a digital signal processor (DSP), or a central processing unit (CPU). In other words, the identification information issuing unit 92 may be implemented by being installed in the microcomputer as an application, for example. Furthermore, the terminal storage unit 93 may be a random access memory (RAM) and a read only memory (ROM), a programmable ROM (PROM) such as a flash memory, or a hard disk drive (HDD), for example.

As shown in FIG. 2, the wireless communication device 10 includes the display unit 20, the input unit 30, a wireless communication unit 40, and the controller 50. The wireless communication unit 40 performs wireless communication with the information terminal device 60. Although not shown, the wireless communication unit 40 includes a communication control IC configured to perform overall control regarding wireless communication, and a wireless transmission/reception circuit configured to perform transmission/reception of information.

The controller 50 includes a display processing unit 51, an authentication data issuing unit 52, an operation control unit 53, and a storage unit 54. Information on operation and management of the air-conditioning apparatus 200, operation programs of the controller 50, and the like are stored in the storage unit 54.

The operation control unit 53 controls operation of the air-conditioning apparatus 200. For example, when a signal indicating contents set by the user is received from the input unit 30, the operation control unit 53 controls an operation state of the air-conditioning apparatus 200 based on the contents set by the user. Furthermore, the operation control unit 53 stops or starts operation of the air-conditioning apparatus 200, when a signal indicating stop or start of operation is received by the input unit 30.

The authentication data issuing unit 52 issues authentication data used to determine whether to permit operation of the air-conditioning apparatus 200 by the information terminal device 60 or not. For example, the authentication data is a unique PIN code, input of which is required when the user specifies a wireless communication device 10 on the display/input unit 70.

Furthermore, the authentication data issuing unit 52 is configured to perform an authentication process by checking the authentication data that is input on the display/input unit 70 and the authentication data that is issued by the authentication data issuing unit 52. When the authentication data that is input on the display/input unit 70 and the authentication data that is issued by the authentication data issuing unit 52 coincide with each other, the authentication data issuing unit 52 transmits, to the terminal display processing unit 91, a permission signal permitting data communication. Data communication between the wireless communication device 10 that is specified by the user and the information terminal device 60, or in other words, remote operation of the air-conditioning apparatus 200 by the information terminal device 60, is thereby enabled.

Here, the authentication data issuing unit 52 may issue unique authentication data whenever a connection process is performed. Alternatively, authentication data may be stored in advance in the storage unit 54, and the authentication data issuing unit 52 may read the authentication data from the storage unit 54 whenever a connection process is performed, for example.

The display processing unit 51 causes the display unit 20 to display various pieces of information. For example, when a signal indicating transition to a menu screen is received by the input unit 30, the display processing unit 51 causes the display unit 20 to display the menu screen. When a signal indicating transition to an immediately preceding screen is received by the input unit 30, the display processing unit 51 causes the display unit 20 to display the immediately preceding screen.

The display processing unit 51 is configured to cause the display unit 20 to display identification information that is issued by the identification information issuing unit 92. In other words, the display processing unit 51 acquires, via the wireless communication unit 40, identification information that is transmitted from the identification information issuing unit 92 via the terminal wireless communication unit 80, and causes the display unit 20 to display the acquired identification information. The display processing unit 51 is further configured to cause the display unit 20 to display authentication data that is issued by the authentication data issuing unit 52.

That is, the display unit 20 displays the identification information issued by the identification information issuing unit 92 in accordance with an instruction from the display processing unit 51. The display unit 20 also displays the authentication data issued by the authentication data issuing unit 52 in accordance with an instruction from the display processing unit 51. At the time of causing the display unit 20 to display the identification information, the display processing unit 51 may cause the display unit 20 to emit light, to increase visibility of the identification information. Additionally, in Embodiment 1, the display unit 20 simultaneously displays the identification information and the authentication data.

The controller 50 here may be implemented by hardware such as a circuit device for implementing each function described above, or may be implemented by software that is executed on an arithmetic device such as a microcomputer, a digital signal processor (DSP), or a central processing unit (CPU). In other words, the authentication data issuing unit 52 may be implemented by being installed in the microcomputer as an application program, for example. Furthermore, the storage unit 54 may be a random access memory (RAM) and a read only memory (ROM), a programmable ROM (PROM) such as a flash memory, or a hard disk drive (HDD), for example.

Figure 3:
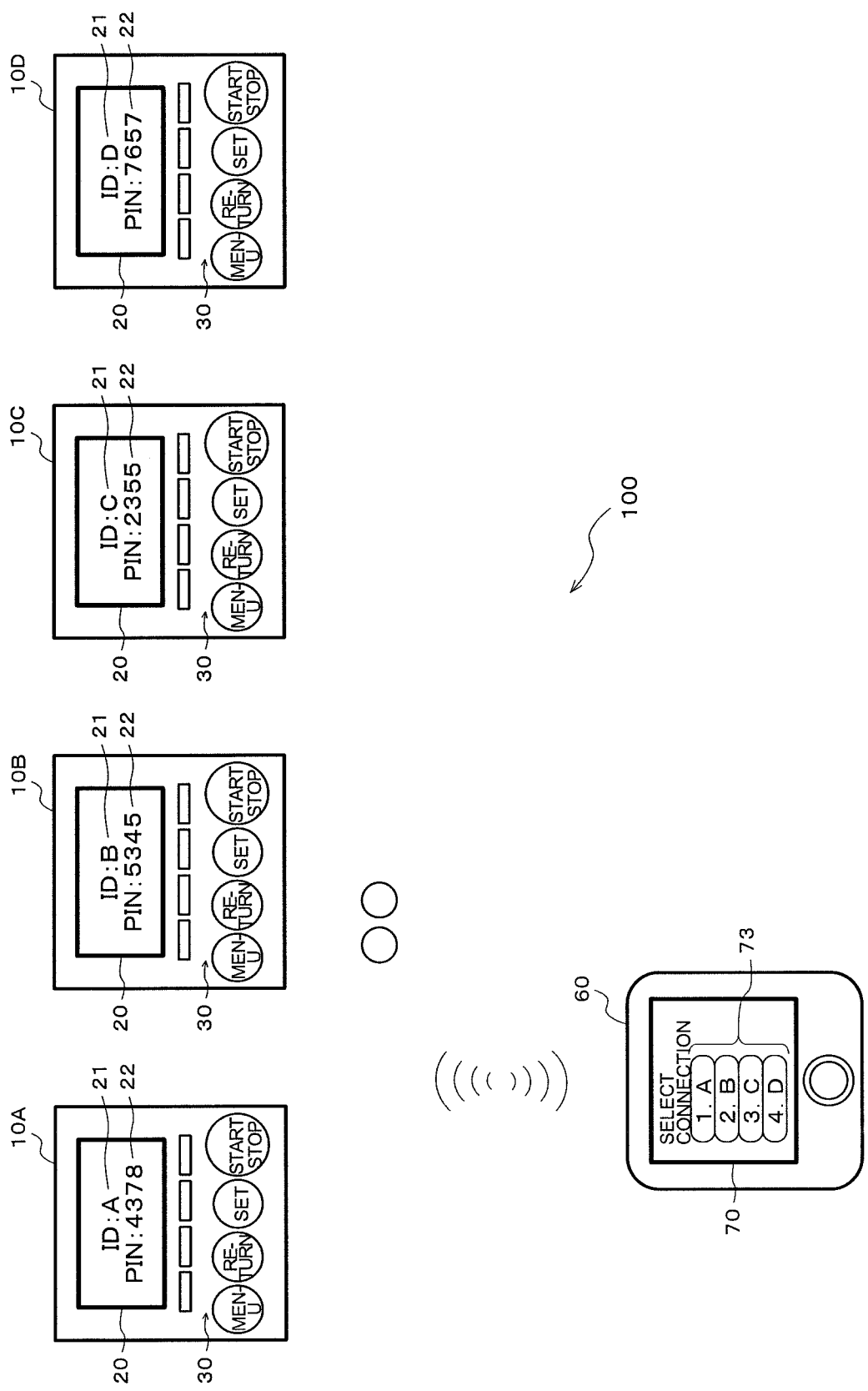
FIG. 3 is an explanatory diagram showing a state where identification information is displayed on wireless communication devices and an information terminal device in FIG. 1.

FIG. 3 is an explanatory diagram showing a state where the identification information is displayed on the wireless communication devices and the information terminal device in FIG. 1. FIG. 3 shows a case where four wireless communication devices 10 that are in a searchable state are present within the searchable range of the information terminal device 60, and reference signs 10A to 10D are added to the wireless communication devices 10, respectively, to distinguish among the wireless communication devices 10. Additionally, in FIG. 3, reference signs of the operation keys on the input unit 30 are omitted.

In the state in FIG. 3, "A", "B", "C", and "D" are issued by the identification information issuing unit 92 as pieces of unique identification information of a wireless communication device 10A, a wireless communication device 10B, a wireless communication device 10C, and a wireless communication device 10D, respectively. Furthermore, the issued pieces of identification information "A" to "D" are transmitted to the wireless communication devices 10A to 10D, respectively, by the identification information issuing unit 92.

Accordingly, "A", "B", "C", and "D" are displayed adjacent to each other in a list display 73 on the display/input unit 70. Furthermore, "A" as identification information 21 and "4378" as authentication data 22 are displayed on the display unit 20 of the wireless communication device 10A. "B" as the identification information 21 and "5345" as the authentication data 22 are displayed on the display unit 20 of the wireless communication device 10B. "C" as the identification information 21 and "2355" as the authentication data 22 are displayed on the display unit 20 of the wireless communication device 10C. "D" as the identification information 21 and "7657" as the authentication data 22 are displayed on the display unit 20 of the wireless communication device 10D.

As described above, with the wireless communication system 100, a simple letter or character string is issued as the identification information of each of the plurality of wireless communication devices 10, and is displayed on the corresponding wireless communication device 10 and the information terminal device 60, and thus, the user can easily specify, in the list display 73, the identification information 21 that is displayed on the wireless communication device 10, which is desired to be remotely operated. In other words, with the wireless communication system 100, the user can easily specify the wireless communication device 10 with which data communication is desired to be performed, from the plurality of wireless communication devices 10. Furthermore, in the example in FIG. 3, since the authentication data 22 is displayed on the display unit 20, together with the identification information 21, the user can perceive in advance that the authentication data 22 is required to be input, and a following authentication process may be smoothly performed.

In FIG. 3, the identification information 21 and the authentication data 22 are distinguished from each other on the display unit 20, by showing "ID" for the identification information 21 and "PIN" for the authentication data 22, but such a notation method is not limited to the example shown in FIG. 3. Furthermore, FIG. 3 shows a case where a number indicating a place in an order is added in front of an alphabet letter that is the identification information, but a number indicating a place in an order may not necessarily be displayed.

Figure 4:
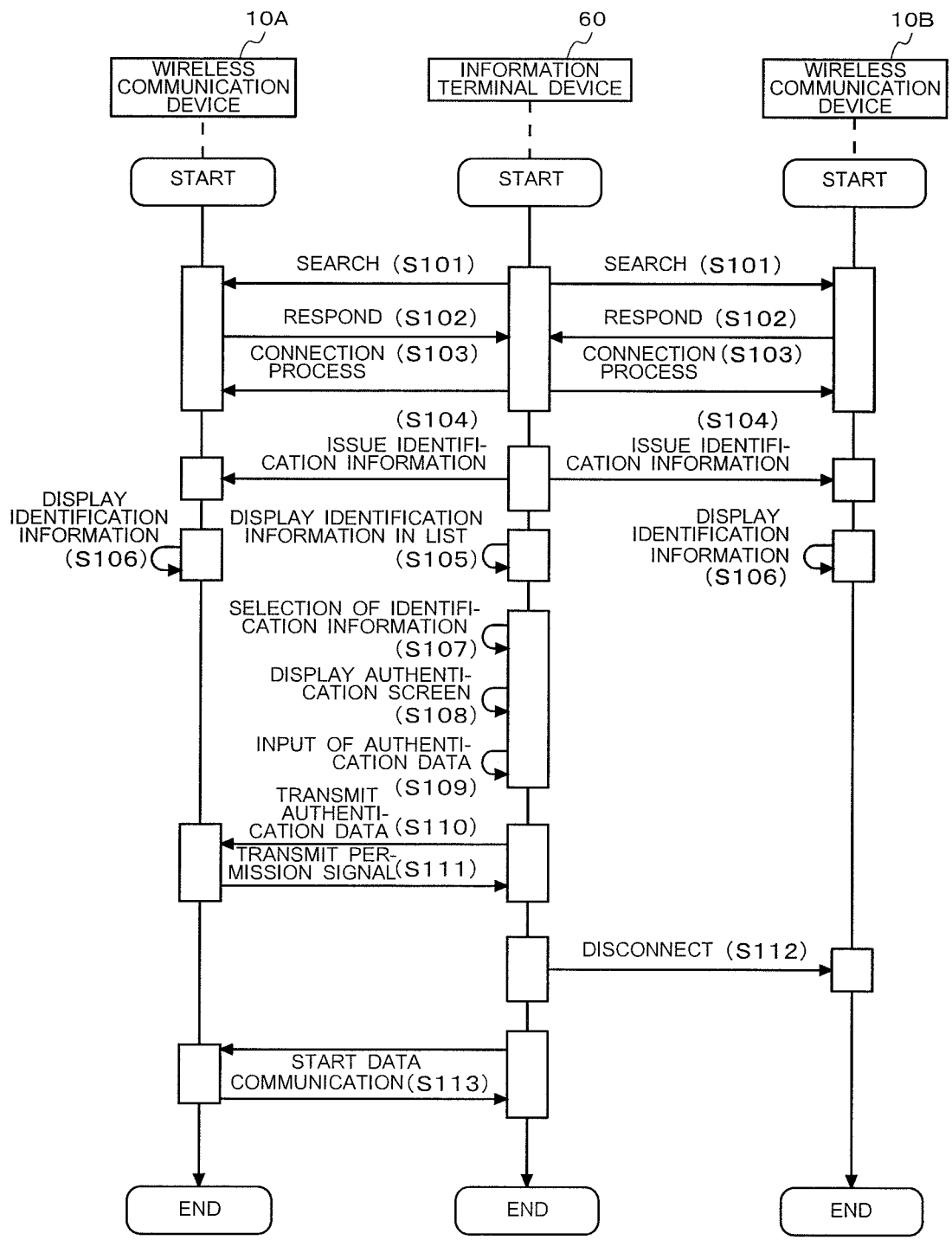
FIG. 4 is a sequence chart showing an operation of the wireless communication system in FIG. 1.

FIG. 4 is a sequence chart showing an operation of the wireless communication system in FIG. 1. An operation of the wireless communication system 100 will be described with reference to FIG. 4. FIG. 4 shows a case where two wireless communication devices 10 that are in a searchable state are present within the searchable range of the information terminal device 60, and the reference signs 10A and 10B are added to the respective wireless communication devices 10 to distinguish between them. Here, a description is given on a case where the user desires to perform data communication with the wireless communication device 10A.

First, the user starts searching for a wireless communication device 10 that can be connected, by operating the display/input unit 70 of the information terminal device 60. In other words, the information terminal device 60 inquires of the wireless communication unit 40 of each of the plurality of wireless communication devices 10, by the terminal wireless communication unit 80, whether a connection process may be performed or not. For example, in the case where the terminal wireless communication unit 80 and the wireless communication unit 40 perform wireless communication by Bluetooth, the information terminal device 60 inquires of each of the plurality of wireless communication devices 10 whether pairing may be performed or not (step S101).

Next, the wireless communication device 10A and the wireless communication device 10B that are in a searchable state respond, as the wireless communication devices 10 that can be connected, to the inquiry from the terminal wireless communication unit 80 in step S101. In other words, the wireless communication device 10A and the wireless communication device 10B respond to the terminal wireless communication unit 80 of the information terminal device 60, via the respective wireless communication units 40, to the effect that a connection process may be performed (step S102).

Next, the information terminal device 60 performs mutual authentication with the wireless communication device 10A by the terminal wireless communication unit 80, and performs the connection process. Furthermore, the information terminal device 60 performs mutual authentication with the wireless communication device 10B by the terminal wireless communication unit 80, and performs the connection process (step S103).

That is, in the case where there are a plurality of wireless communication devices 10 with which the connection process can be performed, the information terminal device 60 repeats a series of processes from step S101 to step S103, and sequentially performs the connection process for all the wireless communication devices 10 with which the connection process can be performed.

Next, the information terminal device 60 issues, by the identification information issuing unit 92, the identification information of the wireless communication device 10A for which the connection process is complete, and the identification information of the wireless communication device 10B for which the connection process is complete. Then, the information terminal device 60 transmits, by the identification information issuing unit 92, the unique identification information to each of the wireless communication device 10A and the wireless communication device 10B (step S104).

Then, the information terminal device 60 displays a list of the identification information on the terminal display unit 71. In the example in FIG. 4, the information terminal device 60 displays the identification information of the wireless communication device 10A and the identification information of the wireless communication device 10B adjacent to each other on the terminal display unit 71 (step S105).

Furthermore, the wireless communication device 10A displays the unique identification information received by the information terminal device 60 on the display unit 20. Likewise, the wireless communication device 10B displays the unique identification information received from the information terminal device 60 on the display unit 20. Here, the wireless communication device 10A and the wireless communication device 10B each issue unique authentication data by the authentication data issuing unit 52. Then, the wireless communication device 10A and the wireless communication device 10B each display the authentication data issued by the authentication data issuing unit 52, on the display unit 20, together with the identification information (step S106).

Next, the user selects, from the pieces of identification information displayed in a list on the display/input unit 70 of the information terminal device 60, the identification information that is displayed on the display unit 20 of the wireless communication device 10A with which data communication is desired to be performed. Then, when the user specifies the wireless communication device 10A on the display/input unit 70 through an operation such as touching on the selected identification information (step S107), the terminal display processing unit 91 receives a signal in accordance with the operation input by the user, from the terminal input unit 72, and causes the display/input unit 70 to display the authentication screen (step S108).

When the user inputs the authentication data that is displayed on the display unit 20 of the wireless communication device 10A, on the authentication screen of the display/input unit 70 (step S109), the information terminal device 60 transmits, by the terminal display processing unit 91, the input authentication data to the authentication data issuing unit 52 of the wireless communication device 10A (step S110). Then, in the case where the authentication data that is transmitted from the terminal display processing unit 91 and the authentication data that is issued by the authentication data issuing unit 52 coincide with each other, the authentication data issuing unit 52 transmits a permission signal to the terminal display processing unit 91. A state is thereby achieved where data communication may be performed between the wireless communication device 10A and the information terminal device 60 (step S111).

Furthermore, the information terminal device 60 cancels the connected state to the wireless communication device 10B to disconnect the wireless communication device 10B. In other words, the information terminal device 60 cancels the connected state to the wireless communication device 10 that is not specified in step S107. For example, in the case where the terminal wireless communication unit 80 and the wireless communication unit 40 perform wireless communication by Bluetooth, the information terminal device 60 cancels the pairing to the wireless communication device 10 that is not specified. Then, the wireless communication device 10A and the wireless communication device 10B delete the identification information and the authentication data from the display units 20 (step S112). Then, the wireless communication system 100 starts data communication between the wireless communication device 10A that is specified in step S107 and the information terminal device 60 (step S113). Additionally, in the case where data communication is desired to be performed with another wireless communication device 10, a series of processes from steps S101 to S113 is performed in the manner described above.

When the connected state to the wireless communication device 10B is canceled by the information terminal device 60 in step S112, the wireless communication device 10A and the wireless communication device 10B may maintain a state where the identification information and the authentication data are displayed on the display units 20 for a specific period of time. Convenience for the user may thereby be enhanced in a case where switching to a state where data communication with another wireless communication device 10 can be performed is desired.

As described above, with the wireless communication system 100, the information terminal device 60 displays, in a list, the identification information of a plurality of wireless communication devices 10, and each wireless communication device 10 displays the identification information of itself. Accordingly, the user can easily select the identification information that is displayed on the wireless communication device 10 with which data communication is desired to be performed, from the list display on the information terminal device 60. Therefore, the wireless communication device 10 connected to the air-conditioning apparatus 200, which is desired to be operated may be easily specified from the plurality of wireless communication devices 10.

In FIG. 3, a simple ID of one alphabet letter is shown as the identification information, but such an example is not restrictive. For example, the identification information may be a simple ID including two or three alphabet letters, or may be a simple ID including three or less numbers, or may be a simple ID that is a combination of two or three alphabet letters and numbers. In other words, in Embodiment 1, the identification information is a simple ID made up of three or less letters including at least one alphabet letter or number. Accordingly, the user can easily select the identification information that is displayed on the wireless communication device 10 with which data communication is desired to be performed, from pieces of identification information that are displayed in a list on the display/input unit 70.

In the description given above, a case is explained where the display unit 20 displays the authentication data together with the identification information, but such an example is not restrictive, and the display unit 20 may display the authentication data when the wireless communication device 10 to which the display unit 20 belongs is specified on the display/input unit 70. In other words, the display processing unit 51 may transmit an issuing command to the authentication data issuing unit 52 of the wireless communication device 10 that is specified, when one wireless communication device 10 is specified by the user on the display/input unit 70 after the display units 20 are caused to display the identification information. Then, the authentication data issuing unit 52 may issue the authentication data according to the issuing command, and the display processing unit 51 may cause the display unit 20 to display the authentication data that is issued by the authentication data issuing unit 52. At this time, the display processing unit 51 may cause the authentication data to be additionally displayed on the display unit 20, or may cause the authentication data to be displayed at a same time as deleting the identification information on the display unit 20. The same applies to each of the following modifications and embodiments described below.

Modification 1-1

Figure 5:
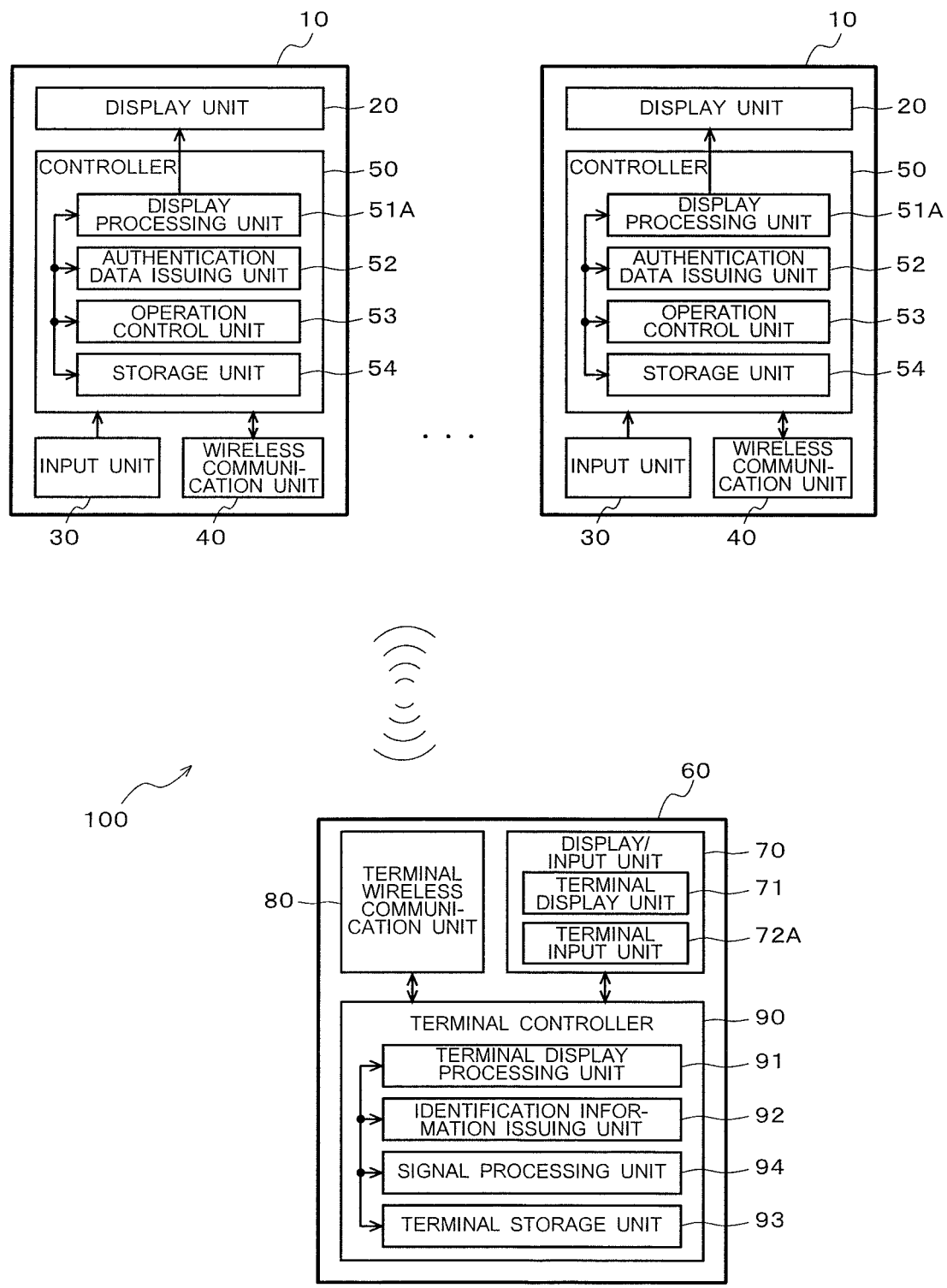
FIG. 5 is a block diagram showing a functional configuration of the wireless communication system according to Modification 1-1 of Embodiment 1 of the present invention.

FIG. 5 is a block diagram showing a functional configuration of the wireless communication system 100 according to Modification 1-1 of Embodiment 1 of the present invention. Structural components the same as those of the wireless communication device 10 and the information terminal device 60 described above are denoted by same reference signs, and a description thereof is omitted.

The display/input unit 70 of Modification 1-1 includes a terminal input unit 72A that is configured to receive a selection operation of selecting one of a plurality of pieces of identification information that are displayed in a list on the terminal display unit 71. The terminal controller 90 of Modification 1-1 includes a signal processing unit 94 that is configured to transmit a selection signal to the wireless communication device 10 corresponding to the identification information selected on the display/input unit 70. The controller 50 of Modification 1-1 includes a display processing unit 51A configured to cause the display unit 20 to output selection information indicating that the identification information of the wireless communication device 10 to which the controller 50 belongs is selected, when the selection signal is transmitted from the signal processing unit 94. In Modification 1-1, the wireless communication device 10 outputs the selection information by the display unit 20 emitting light, when the identification information of the wireless communication device 10 is selected on the display/input unit 70.

More specifically, for example, when one of pieces of identification information displayed in a list on the terminal display unit 71 is long-pressed, the terminal input unit 72A recognizes that a selection operation is performed, and when one of the pieces of identification information displayed in a list on the terminal display unit 71 is tapped, the terminal input unit 72A recognizes that a specifying operation is performed. The terminal input unit 72A is configured to transmit an identification signal according to the selected identification information to the signal processing unit 94, when it is recognized that a selection operation is performed. The terminal input unit 72A is otherwise configured in the same manner as the terminal input unit 72 described above.

The signal processing unit 94 transmits the selection signal to the wireless communication device 10 corresponding to the identification signal that is transmitted from the terminal input unit 72A. The display processing unit 51A causes the display unit 20 to emit light, when the selection signal is received from the signal processing unit 94. The display processing unit 51A is otherwise configured in the same manner as the display processing unit 51 described above. In the case where a configuration is adopted according to which the display unit 20 is caused to emit light at the time of displaying the identification information, the display processing unit 51A may increase brightness of a backlight of the display unit 20 and cause the display unit 20 to emit more light than in a state where the identification information is displayed, when the identification information is selected on the display/input unit 70.

As described above, with the wireless communication system 100 of Modification 1-1, the display unit 20 of one of the wireless communication devices 10 emits light according to a selection operation on the display/input unit 70. Accordingly, the user can grasp at a glance which identification information corresponds to which wireless communication device 10, by selecting one of pieces of identification information that are displayed in a list on the display/input unit 70 through an operation such as a long-press. Therefore, with the wireless communication system 100 of Modification 1-1, the wireless communication device 10 connected to the air-conditioning apparatus 200, which is desired to be operated, may be easily specified among the plurality of wireless communication devices 10.

Here, the identification information issuing unit 92 may not necessarily be configured to transmit issued identification information to each of the plurality of wireless communication devices 10, and the display processing unit 51A may not necessarily be configured to cause the display unit 20 to display the identification information. Also in such a case, with the wireless communication system 100 of Modification 1-1, when the identification information is selected on the display/input unit 70, the display unit 20 of the wireless communication device 10 corresponding to the selected identification information emits light, and the wireless communication device 10 that is desired to be remotely operated may be easily specified.

Modification 1-2

Figure 6:
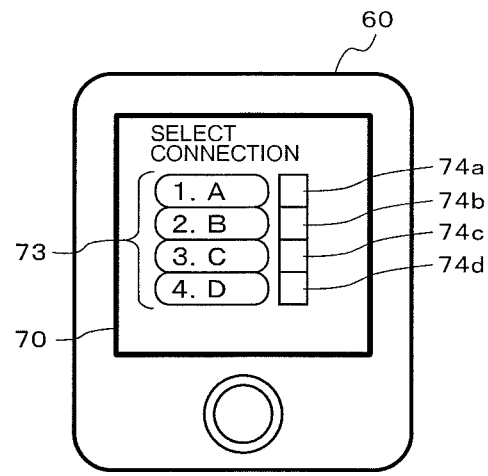
FIG. 6 is an explanatory diagram showing a state where identification information is displayed on the information terminal device in the wireless communication system according to Modification 1-2 of Embodiment 1 of the present invention.

FIG. 6 is an explanatory diagram showing a state where the identification information is displayed on the information terminal device 60 in the wireless communication system 100 according to Modification 1-2 of Embodiment 1 of the present invention. In Modification 1-1 described above, a configuration is described according to which the terminal input unit 72A distinguishes between the selection operation from the specifying operation according to the type of a touch operation, but such a configuration is not restrictive. In other words, as shown in FIG. 6, the terminal display processing unit 91 may cause the terminal display unit 71 to display, together with the list of identification information, a plurality of selection keys corresponding to respective identification information. The wireless communication system 100 of Modification 1-2 is otherwise configured in the same manner as in Modification 1-1 described above.

In the example in FIG. 6, a selection key 74a corresponding to the identification information "A", a selection key 74b corresponding to the identification information "B", a selection key 74c corresponding to the identification information "C", and a selection key 74d corresponding to the identification information "D" are displayed. In this case, when the user performs a touch operation on the selection key 74a, for example, the display unit 20 of the wireless communication device 10 corresponding to the identification information "A" emits light. In the same manner, when the user performs a touch operation on the selection key 74b, the selection key 74c, or the selection key 74d, the display unit 20 of the wireless communication device 10 corresponding to the identification information "B", the identification information "C", or the identification information "D" emits light.

As described above, with the wireless communication system of Modification 1-2, the terminal display unit 71 is caused to display the selection keys corresponding to the plurality of pieces of identification information, respectively, and thus, a situation may be avoided where the user specifies a wrong wireless communication device 10 by an erroneous touch operation, for example.

Modification 1-3

Figure 7:
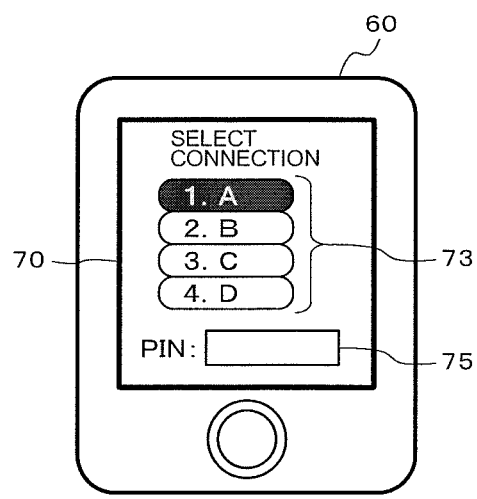
FIG. 7 is an explanatory diagram showing a state where identification information is displayed on the information terminal device in the wireless communication system according to Modification 1-3 of Embodiment 1 of the present invention.

FIG. 7 is an explanatory diagram showing a state where the identification information is displayed on the information terminal device 60 in the wireless communication system 100 according to Modification 1-3 of Embodiment 1 of the present invention. An example is described above, where the terminal display processing unit 91 causes the authentication screen to be displayed according to the specifying operation by the user on the display/input unit 70, but such an example is not restrictive. For example, as shown in FIG. 7, the terminal display processing unit 91 may cause an input section 75 for authentication data to be displayed, together with the list of identification information.

In this case, when one piece of identification information is specified through an operation such as a touch operation, the display/input unit 70 may place the specified identification information to be in a different display state from other pieces of identification information. When the user specifies one of the pieces of identification information, and inputs the authentication data in the input section 75, the terminal input unit 72 may transmit the input authentication data to the wireless communication device 10 corresponding to the specified identification information.

Also in this case, the authentication data issuing unit 52 may determine whether the authentication data that is transmitted from the information terminal device 60 and the authentication data that is issued by the authentication data issuing unit 52 coincide with each other or not. In other words, with the wireless communication system 100 of Modification 1-3, the authentication screen does not have to be separately displayed on the terminal display unit 71, and there is an advantage that a screen switching process may be omitted. Furthermore, in the case where a configuration is adopted according to which the identification information that is specified on the display/input unit 70 is placed in a different display state from other pieces of identification information, the user can input the authentication data while looking at the specified identification information, and an erroneous input due to erroneous specification can be prevented, for example.

In the example in FIG. 7, a case is shown where the identification information "A" is highlighted when the identification information "A" is selected, but such an example is not restrictive, and it is alternatively possible to change a color or a size of the specified identification information, or to change the display state by combining such changes, for example.

In step S112 in FIG. 4, when the wireless communication device 10 that is not specified is disconnected by the information terminal device 60, each wireless communication device 10 may maintain, for a specific period of time, a state where the identification information and the authentication data are displayed on the display unit 20. Accordingly, with the wireless communication system 100 of Modification 1-3, after the specifying operation by the user, the terminal display unit 71 does not transition to the authentication screen but displays the identification information in a list, and thus, switching to a state where data communication may be performed with another wireless communication device 10 may be even more easily performed.

Modification 1-4

Figure 8:
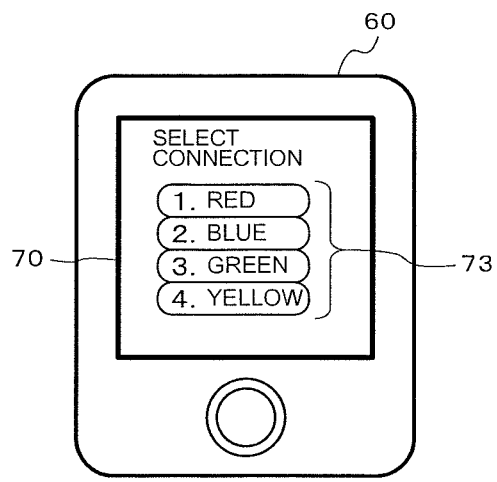
FIG. 8 is an explanatory diagram showing a state where identification information is displayed on the information terminal device in the wireless communication system according to Modification 1-4 of Embodiment 1 of the present invention.

FIG. 8 is an explanatory diagram showing a state where the identification information is displayed on the information terminal device 60 in the wireless communication system 100 according to Modification 1-4 of Embodiment 1 of the present invention. With the wireless communication system 100 of Modification 1-4, the display unit 20 of each of the plurality of wireless communication devices 10 is capable of performing display in full colors, by using an RGB-LED or a full-color liquid crystal display, for example. The same structural components as those of the wireless communication system 100 described above are denoted by same reference signs, and a description thereof is omitted.

The identification information issuing unit 92 of Modification 1-4 issues, as the identification information, information on a display color on the display unit 20 of each wireless communication device 10. Information on a display color is information on a color such as red, and the identification information issuing unit 92 sets a display color indicating a color that is unique to each wireless communication device 10.

The terminal display processing unit 91 of Modification 1-4 causes information on a display color issued by the identification information issuing unit 92 to be displayed in a list in the manner of the list display 73 shown in FIG. 8. In Modification 1-4, the display processing unit 51 of each wireless communication device 10 illuminates the display unit 20 in accordance with the information on a display color issued by the identification information issuing unit 92.

The user can thus easily specify, on the display/input unit 70, the wireless communication device 10 with which data communication is desired to be performed, by comparing pieces of the information on a display color displayed in a list on the terminal display unit 71 and the display color of the display unit 20 of each wireless communication device 10.

FIG. 8 shows a case where the information on a display color is displayed in a list on the terminal display unit 71, but such a case is not restrictive. The terminal display processing unit 91 may cause a virtual key, corresponding to the identification information, that emits light in a same color as the display color of each wireless communication device 10, to be displayed in a list on the terminal display unit 71. In other words, in the example in FIG. 8, in the list display 73, a virtual key corresponding to "red" as the identification information may be lighted in red, a virtual key corresponding to "blue" as the identification information may be lighted in blue, a virtual key corresponding to "green" as the identification information may be lighted in green, and a virtual key corresponding to "yellow" as the identification information may be lighted in "yellow". In this case, display of a letter and light emission in color may both be performed as the identification information, or only the light emission in color may be performed. Also in this case, the user can easily specify, on the display/input unit 70, the wireless communication device 10 with which data communication is desired to be performed, by comparing each color in the list display 73 and the display color of the display unit 20 of each wireless communication device 10.

Embodiment 2

Figure 9:
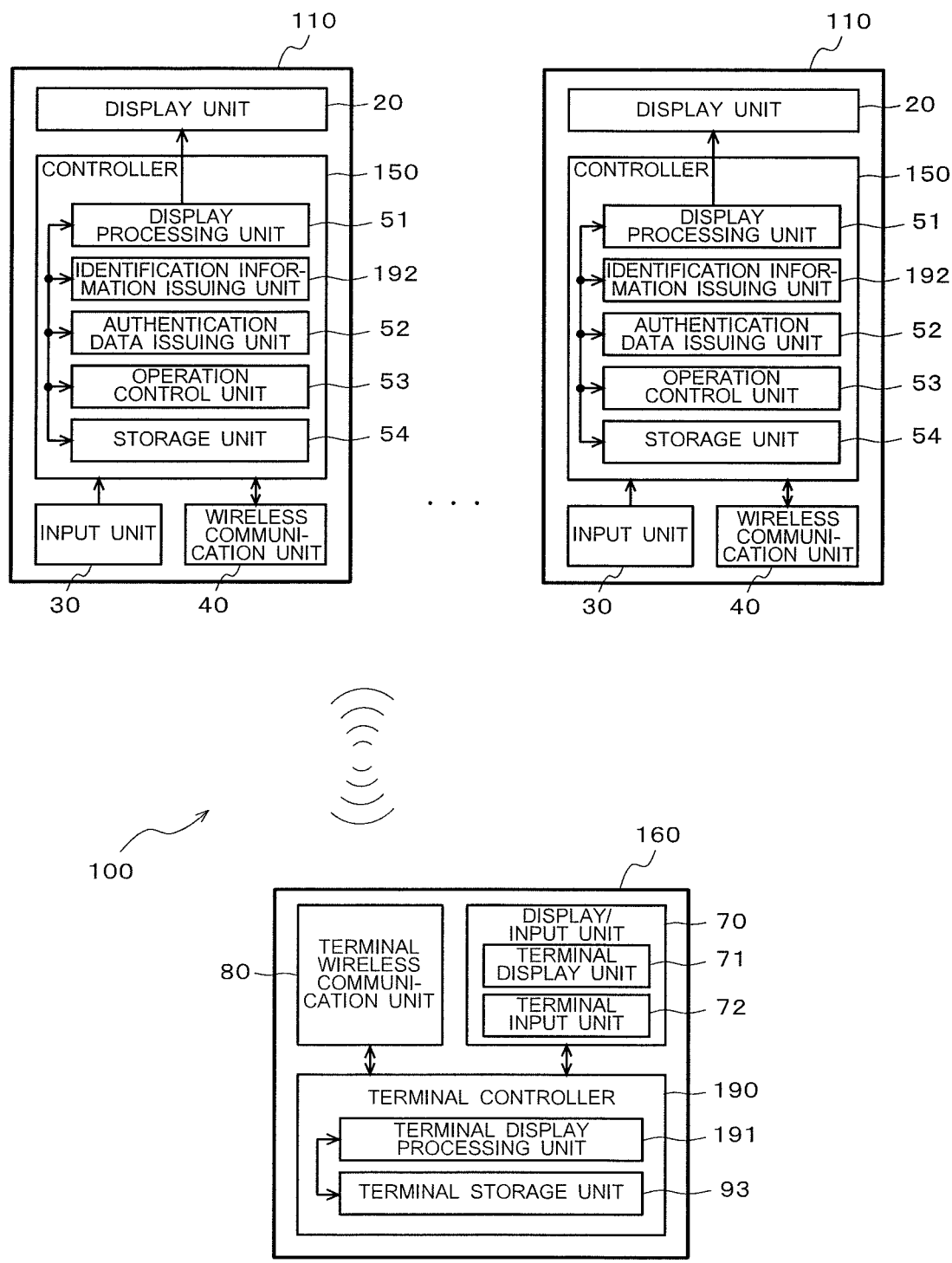
FIG. 9 is a block diagram showing a functional configuration of a wireless communication system according to Embodiment 2 of the present invention.

FIG. 9 is a block diagram showing a functional configuration of a wireless communication system according to Embodiment 2 of the present invention. As shown in FIG. 9, a wireless communication system 100 in Embodiment 2 includes a plurality of wireless communication devices 110, and an information terminal device 160. Structural components the same as those in Embodiment 1 described above are denoted by same reference signs, and a description thereof is omitted.

Controllers 150 of the plurality of wireless communication devices 110 each include an identification information issuing unit 192 configured to issue unique identification information. The identification information issuing unit 192 configured to transmit the issued identification information to the information terminal device 160 via the wireless communication unit 40. Here, the identification information issuing unit 192 may issue simple and unique identification information whenever a connection process is performed. Alternatively, for example, simple and unique identification information may be stored in advance in the storage unit 54, and the identification information issuing unit 192 may read the identification information from the storage unit 54 whenever a connection process is performed, for example.

The plurality of wireless communication devices 110 may each be connected by a cable or wirelessly so that data communication can be performed. Adjustment may be performed such that there is no overlapping identification information among the plurality of wireless communication devices 110, and the wireless communication devices 110 each may issue unique identification information. The plurality of wireless communication devices 110 may thus each issue unique identification information without requiring the user to perform a burdensome operation, for example. Moreover, overlapping of identification information may be reliably avoided even in a case where the air-conditioning apparatus 200 is additionally installed. The identification information issuing unit 192 is otherwise configured in the same manner as the identification information issuing unit 92 of Embodiment 1.

A terminal controller 190 of the information terminal device 160 includes a terminal display processing unit 191 that is configured to cause the terminal display unit 71 to display the identification information that is issued by the identification information issuing unit 192. The terminal display processing unit 191 causes pieces of identification information transmitted from the plurality of wireless communication devices 110 to be displayed in a list on the terminal display unit 71. The terminal display processing unit 191 is otherwise configured in the same manner as the identification information issuing unit 192 of Embodiment 1.

Figure 10:
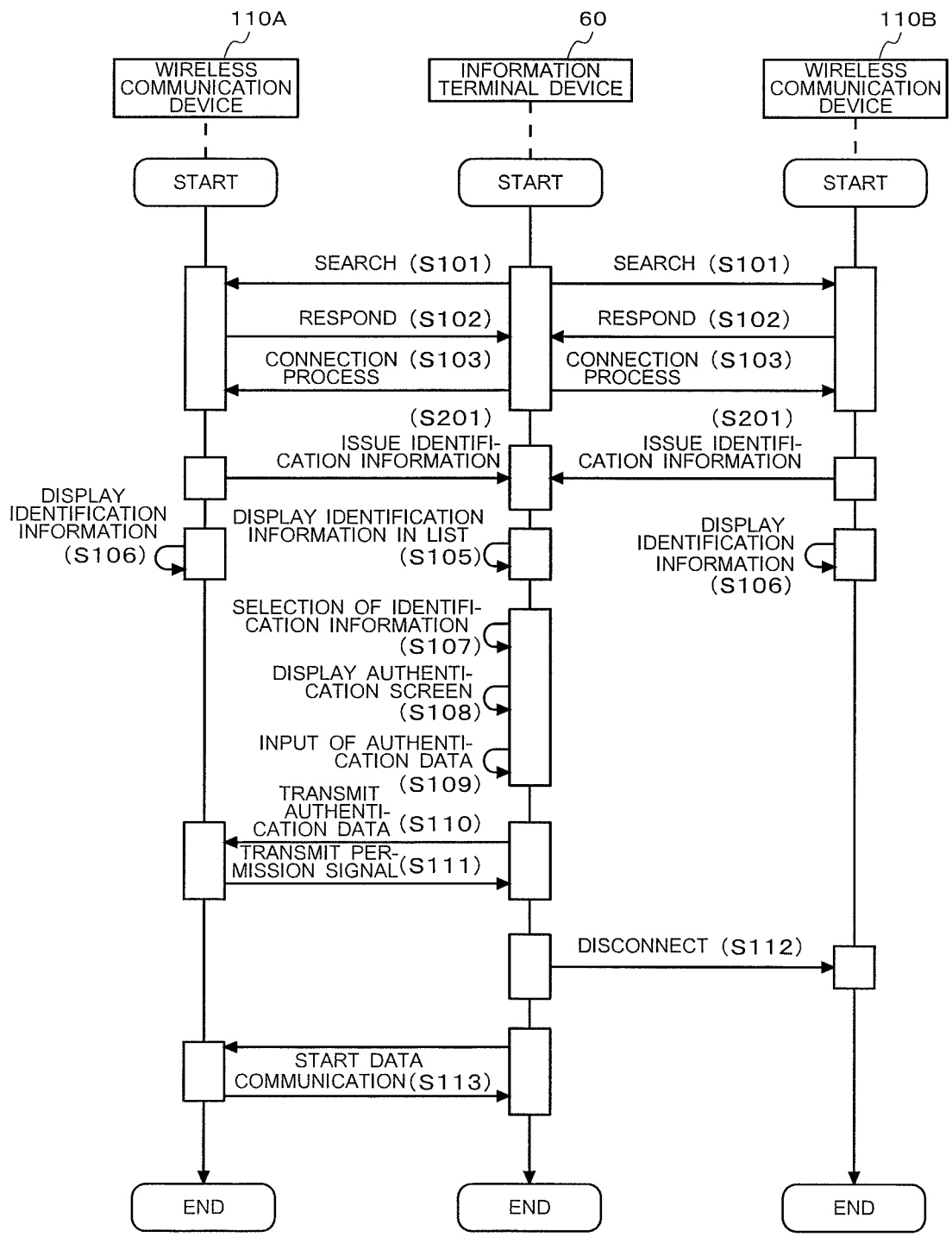
FIG. 10 is a sequence chart showing an operation of the wireless communication system in FIG. 9.

FIG. 10 is a sequence chart showing an operation of the wireless communication system in FIG. 9. In FIG. 10, the same steps as those in FIG. 4 described above are denoted by same reference signs. Also in FIG. 10, as in FIG. 4, a case is shown where two wireless communication devices 110 that are in a searchable state are present within the searchable range of the information terminal device 160, and reference signs 110A and 110B are added to the respective wireless communication devices 110 to distinguish one from the other. With respect to the operation of the wireless communication system 100 of Embodiment 2, differences to that of Embodiment 1 described above will be described with reference to FIG. 10.

First, the wireless communication system 100 of Embodiment 1 performs the processes from steps S101 to S103 in the same manner as in FIG. 4. Next, the wireless communication device 110A issues unique identification information by the identification information issuing unit 192, and transmits the issued identification information to the terminal display processing unit 191. The wireless communication device 110B also issues unique identification information by the identification information issuing unit 192, and transmits the issued identification information to the terminal display processing unit 191 (step S201).

Next, the information terminal device 60 displays the identification information transmitted from the wireless communication device 110A and the identification information transmitted from the wireless communication device 110B in a list on the display/input unit 70 (step S105). Furthermore, the wireless communication device 110A displays the identification information issued by the identification information issuing unit 192 on the display unit 20. In the same manner, the wireless communication device 110B displays the identification information issued by the identification information issuing unit 192 on the display unit 20 (step S106). Then, a series of processes from steps S107 to S113 is performed in the same manner as in FIG. 4.

As described above, with the wireless communication system 100 of Embodiment 2, the plurality of wireless communication device 110 each issue respective identification information, and thus, a program for implementing the function of the identification information issuing unit 92 may not necessarily be installed in a computer such as a microcomputer. Moreover, with the wireless communication system 100 of Embodiment 2, the information terminal device 160 displays in a list the identification information of each of the plurality of wireless communication devices 110, and also, each wireless communication device 110 displays the identification information of itself. Accordingly, the user can easily select from the list display on the information terminal device 160, the identification information that is displayed on the wireless communication device 110 with which data communication is desired to be performed. Therefore, the wireless communication device 110 connected to the air-conditioning apparatus 200, which is desired to be operated, may be easily specified among the plurality of wireless communication devices 110.

Also in Embodiment 2, as in Modification 1-4 described above, the display unit 20 of each of the plurality of wireless communication devices 110 may perform display in full colors. The identification information issuing unit 192 may issue, as the identification information, information on a display color on the display unit 20 of the corresponding wireless communication device 10. The terminal display processing unit 191 may cause the terminal display unit 71 to display, in a list, the information on a display color issued by the identification information issuing unit 192. The terminal display processing unit 191 may further cause the terminal display unit 71 to display in a list, virtual keys, as the identification information, that each emit light in a color same as the display color of the corresponding wireless communication device 110. Moreover, the display processing unit 51 of each wireless communication device 110 may illuminate the display unit 20 according to the information on a display color issued by the identification information issuing unit 192. Also in this case, the user can easily specify, on the display/input unit 70, the wireless communication device 110 with which data communication is desired to be performed, by comparing each piece of information on a color or a color in the list display on the terminal display unit 71 and the display color of the display unit 20 of each wireless communication device 110.

Embodiment 3

Figure 11:
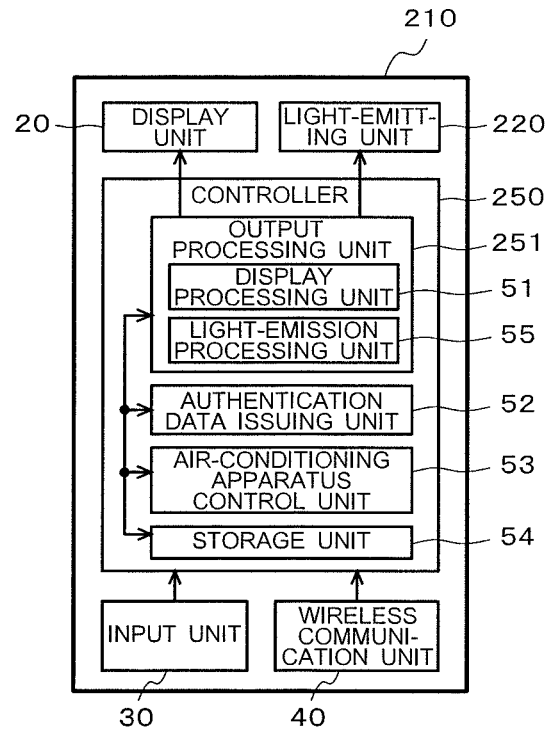
FIG. 11 is a block diagram showing a functional configuration of a wireless communication device in a wireless communication system according to Embodiment 3 of the present invention.

FIG. 11 is a block diagram showing a functional configuration of a wireless communication device in a wireless communication system according to Embodiment 3 of the present invention. As shown in FIG. 11, the wireless communication system 100 of Embodiment 3 includes a plurality of wireless communication devices 210, and the information terminal device 60 according to Modification 1-1 of Embodiment 1. The same structural components as those of Modification 1-1 of Embodiment 1 are denoted by same reference signs, and a description thereof is omitted.

As shown in FIG. 11, controllers 250 of the plurality of wireless communication devices 210 each include an output processing unit 251, and the output processing unit 251 includes the display processing unit 51 and a light-emission processing unit 55. Furthermore, the plurality of wireless communication devices 210 each include a light-emitting unit 220. For example, the light-emitting unit 220 includes one or more LEDs.

When it is recognized that a selection operation is performed, the terminal input unit 72A transmits to the signal processing unit 94 an identification signal according to selected identification information. Then, the signal processing unit 94 transmits a selection signal to the wireless communication device 210 corresponding to the identification signal that is transmitted from the terminal input unit 72A.

When the selection signal is transmitted from the signal processing unit 94, the light-emission processing unit 55 causes the light-emitting unit 220 to output selection information indicating that the identification information of the wireless communication device 210 to which the light-emission processing unit 55 belongs is selected. More specifically, the wireless communication device 210 is configured such that, when the identification information of the wireless communication device 210 is selected on the terminal input unit 72A, the light-emitting unit 220 outputs the selection information by emitting light. In other words, the light-emission processing unit 55 causes the light-emitting unit 220 to emit light, when the selection signal is received from the signal processing unit 94. Here, the light-emission processing unit 55 may cause the light-emitting unit 220 to emit light or may cause the light-emitting unit 220 to blink, when the selection signal is received by the signal processing unit 94.

As described above, with the wireless communication system 100 of Embodiment 3, the light-emitting unit 220 of one of the wireless communication devices 210 emits light according to a selection operation on the display/input unit 70. Accordingly, the user can grasp at a glance which identification information corresponds to which wireless communication device 210, by selecting, by long-press or the like, one of pieces of identification information that are displayed in a list on the display/input unit 70. Therefore, with the wireless communication system 100 of Embodiment 3, the wireless communication device 210 that is connected to the air-conditioning apparatus 200 that is desired to be operated may be even more easily specified among the plurality of wireless communication devices 210.

Here, the identification information issuing unit 92 may not necessarily be configured to transmit issued identification information to each of the plurality of wireless communication devices 10, and the display processing unit 51A may not necessarily be configured to cause the display unit 20 to display the identification information. Also in such a case, with the wireless communication system 100 of Embodiment 3, when the identification information is selected on the display/input unit 70, the light-emitting unit 220 of the wireless communication device 210 corresponding to the selected identification information emits light, and the wireless communication device 210 with which data communication is desired to be performed may be easily specified.

Embodiment 4

Figure 12:
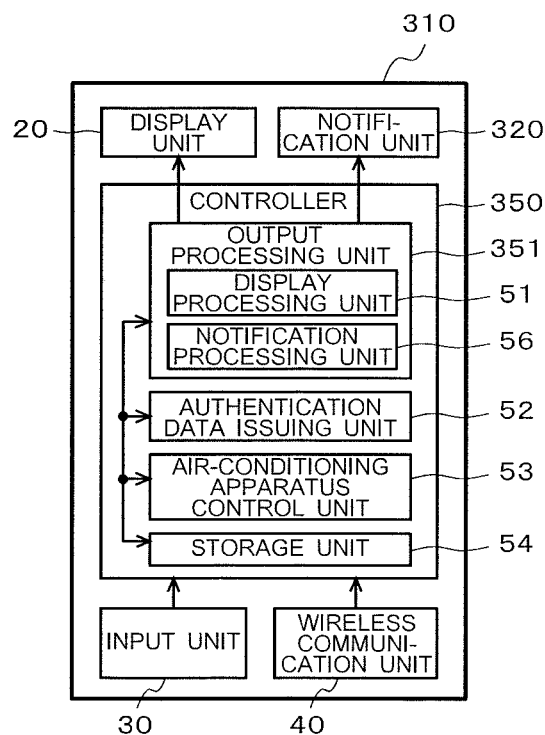
FIG. 12 is a block diagram showing a functional configuration of a wireless communication device in a wireless communication system according to Embodiment 4 of the present invention.

FIG. 12 is a block diagram showing a functional configuration of a wireless communication device in a wireless communication system according to Embodiment 4 of the present invention. As shown in FIG. 12, the wireless communication system 100 of Embodiment 4 includes a plurality of wireless communication devices 310, and the information terminal device 60 according to Modification 1-1 of Embodiment 1. The same structural components as those of Modification 1-1 of Embodiment 1 are denoted by same reference signs, and a description thereof is omitted.

As shown in FIG. 12, controllers 250 of the plurality of wireless communication devices 310 each include an output processing unit 351, and the output processing unit 351 includes the display processing unit 51 and a notification processing unit 56. Furthermore, the plurality of wireless communication devices 310 each include a notification unit 320. The notification unit 320 includes a speaker, for example, and outputs a sound, such as a beep, or a voice.

When it is recognized that a selection operation is performed, the terminal input unit 72A transmits an identification signal according to selected identification information to the signal processing unit 94. Then, the signal processing unit 94 transmits a selection signal to the wireless communication device 310 corresponding to the identification signal that is transmitted from the terminal input unit 72A.

When the selection signal is transmitted from the signal processing unit 94, the notification processing unit 56 causes the notification unit 320 to output selection information indicating that the identification information of the wireless communication device 310 to which the notification processing unit 56 belongs is selected. More specifically, the wireless communication device 310 is configured such that, when the identification information of the wireless communication device 310 is selected on the terminal input unit 72A, the notification unit 320 outputs the selection information by outputting a sound. In other words, the notification processing unit 56 causes the notification unit 320 to output a sound or a voice, when the selection signal is received by the signal processing unit 94. For example, in the case where the notification unit 320 is a buzzer, the notification processing unit 56 causes the buzzer to sound, to thereby cause the user to recognize the wireless communication device 310 to which the notification processing unit 56 belongs.

As described above, with the wireless communication system 100 of Embodiment 4, the notification unit 320 of one of the wireless communication devices 310 outputs a sound according to a selection operation on the display/input unit 70. Accordingly, the user can grasp through listening which identification information corresponds to which wireless communication device 310, by selecting, by long-press or the like, one of pieces of identification information that are displayed in a list on the display/input unit 70. Therefore, with the wireless communication system 100 of Embodiment 4, the wireless communication device 310 connected to the air-conditioning apparatus 200, which is desired to be operated, may be even more easily specified among the plurality of wireless communication devices 310.

Here, the identification information issuing unit 92 may not necessarily be configured to transmit issued identification information to each of the plurality of wireless communication devices 10, and the display processing unit 51A may not necessarily be configured to cause the display unit 20 to display the identification information. Also in such a case, with the wireless communication system 100 of Embodiment 4, when the identification information is selected on the display/input unit 70, the notification unit 320 of the wireless communication device 310 corresponding to the selected identification information emits light, and the wireless communication device 310 that is desired to be remotely operated may be easily specified.

Embodiment 5

Figure 13:
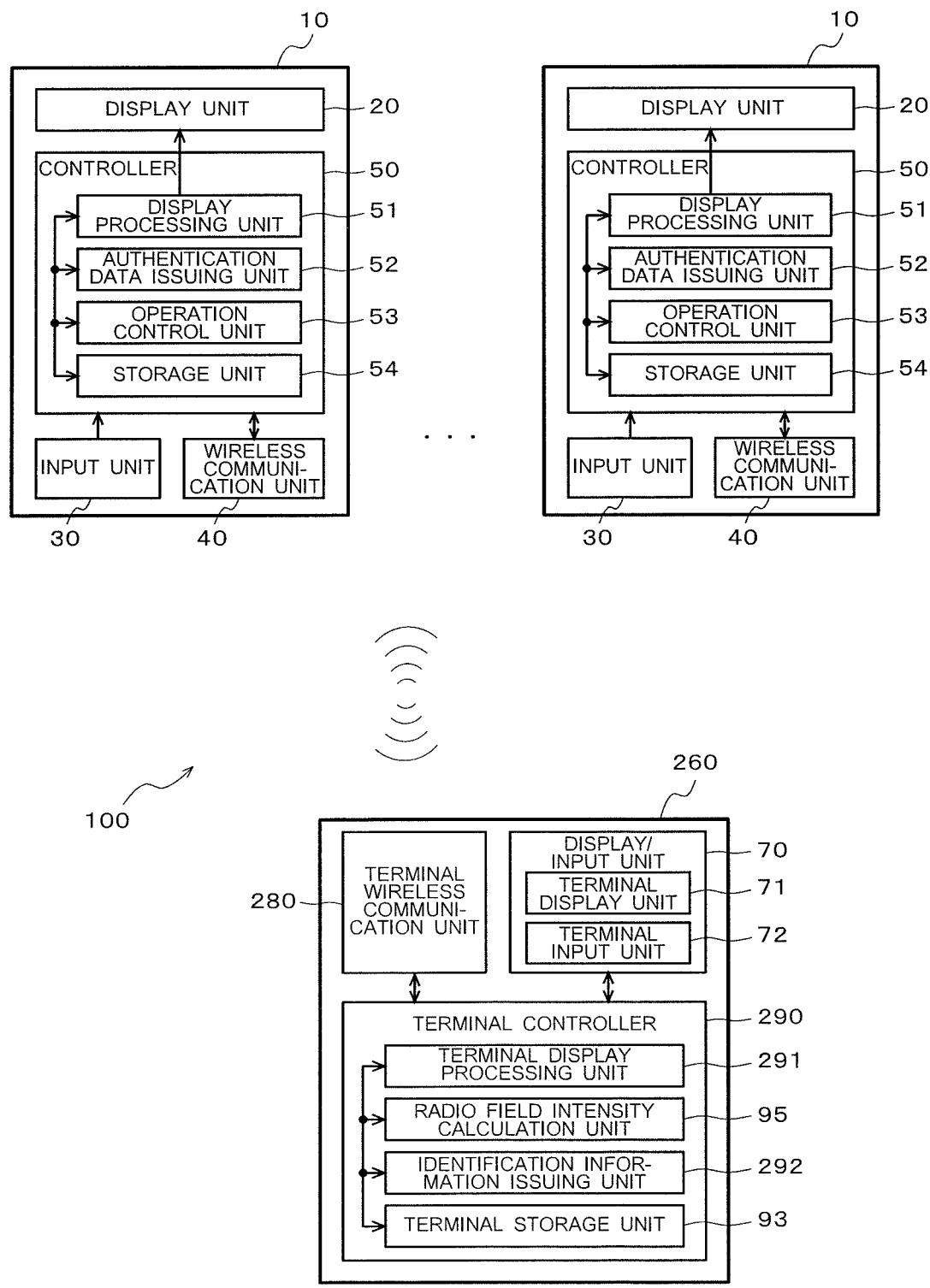
FIG. 13 is a block diagram showing a functional configuration of a wireless communication system according to Embodiment 5 of the present invention.

FIG. 13 is a block diagram showing a functional configuration of a wireless communication system according to Embodiment 5 of the present invention. Each embodiment described above describes a case where pieces of identification information of the plurality of wireless communication devices 10 are randomly displayed. However, the user probably operates the information terminal device at a position where the wireless communication device to be selected can be seen, or in other words, at a position relatively close to the wireless communication device desired to be operated.

Accordingly, with the wireless communication system 100 of Embodiment 5, pieces of identification information are displayed being rearranged based on strengths of radio waves for wireless communication by the plurality of wireless communication devices 10 present within the searchable range. The same components as those of the embodiments described above are denoted by same reference signs, and a description thereof is omitted.

As shown in FIG. 13, the wireless communication system 100 of Embodiment 5 includes a plurality of wireless communication devices 10, and an information terminal device 260. The information terminal device 260 includes the display/input unit 70, a terminal wireless communication unit 280, and a terminal controller 290. The terminal controller 290 includes a terminal display processing unit 291, a field intensity calculation unit 95, an identification information issuing unit 292, and the terminal storage unit 93.

The terminal wireless communication unit 280 includes a function of separately detecting radio waves for wireless communication by the plurality of wireless communication devices 10 that are present within the searchable range. The terminal wireless communication unit 280 is otherwise configured in the same manner as the terminal wireless communication unit 80 of Embodiment 1. The field intensity calculation unit 95 determines a field intensity of each of the plurality of wireless communication devices 10 based on the radio wave detected by the terminal wireless communication unit 280.

The identification information issuing unit 292 issues identification information of each of the plurality of wireless communication devices 10. The identification information issuing unit 292 of Embodiment 5 issues unique identification information that is associated with the field intensity determined by the field intensity calculation unit 95. When there are no obstacles, there is a correlation between a distance between the wireless communication device 10 and the information terminal device 260, and the field intensity of the wireless communication device 10. Accordingly, the identification information issuing unit 292 may estimate a position of each wireless communication device 10 according to the field intensity. More specifically, the identification information issuing unit 292 may estimate that the distance between the wireless communication device 10 with a relatively large field intensity and the information terminal device 260 is relatively small, and that the distance between the wireless communication device 10 with a relatively small field intensity and the information terminal device 260 is relatively great.

Accordingly, the identification information issuing unit 292 issues pieces of unique identification information clearing indicating an order such as "001, 002, . . . " for the wireless communication devices 10, in a descending order from largest field intensity. Relatively simple and easy-to-grasp identification information may thereby be assigned to the wireless communication device 10 with a large field intensity that is expected to be present in front of the user. The identification information issuing unit 292 may issue pieces of unique identification information according to positions, in a left-right direction, of the plurality of wireless communication devices. In other words, as shown in FIG. 3, the identification information issuing unit 292 may issue pieces of unique identification information clearing indicating an order such as "A, B, . . . " from the wireless communication device 10 on the left. A correspondence relationship between the position of each wireless communication device and the identification information is thereby made clear, and the user is enabled to easily specify a wireless communication device.

Furthermore, the identification information issuing unit 292 causes the identification information of each of the plurality of wireless communication devices 10 and the information on the field intensity of each of the plurality of wireless communication devices 10 to be stored in the terminal storage unit 93, in association with each other. The identification information issuing unit 292 is otherwise configured in the same manner as the identification information issuing unit 92 of Embodiment 1.

The terminal display processing unit 291 causes the terminal display unit 71 to display, in a list, pieces of identification information that are issued by the identification information issuing unit 92, in the descending order from the largest field intensity, each field intensity being associated with a piece of identification information. For example, in the case where the distance from the information terminal device 260 is increased in the order of the wireless communication devices 10A to 10D, as shown in FIG. 3, the radio field intensities of the wireless communication devices 10A to 10D are normally reduced in such an order. Accordingly, the terminal display processing unit 291 refers to the information on the radio field intensities in the terminal storage unit 93, and displays, in a list, from a top, pieces of identification information of the wireless communication devices 10A to 10D. In other words, the terminal display processing unit 291 displays the pieces of identification information in the descending order from the identification information of the wireless communication device 10 with a relatively large field intensity. Accordingly, the identification information of the wireless communication device 10 with a relatively small distance from the information terminal device 260 may be preferentially displayed at a top part of the terminal display unit 71. Additionally, the terminal display processing unit 291 of Embodiment 5 selects the wireless communication device 10 that is to come first, second, . . . , in the order, based on comparison of the radio field intensities, and thus, the terminal display processing unit 291 includes a function of a "communication device selection unit" of the present invention.

Figure 14:
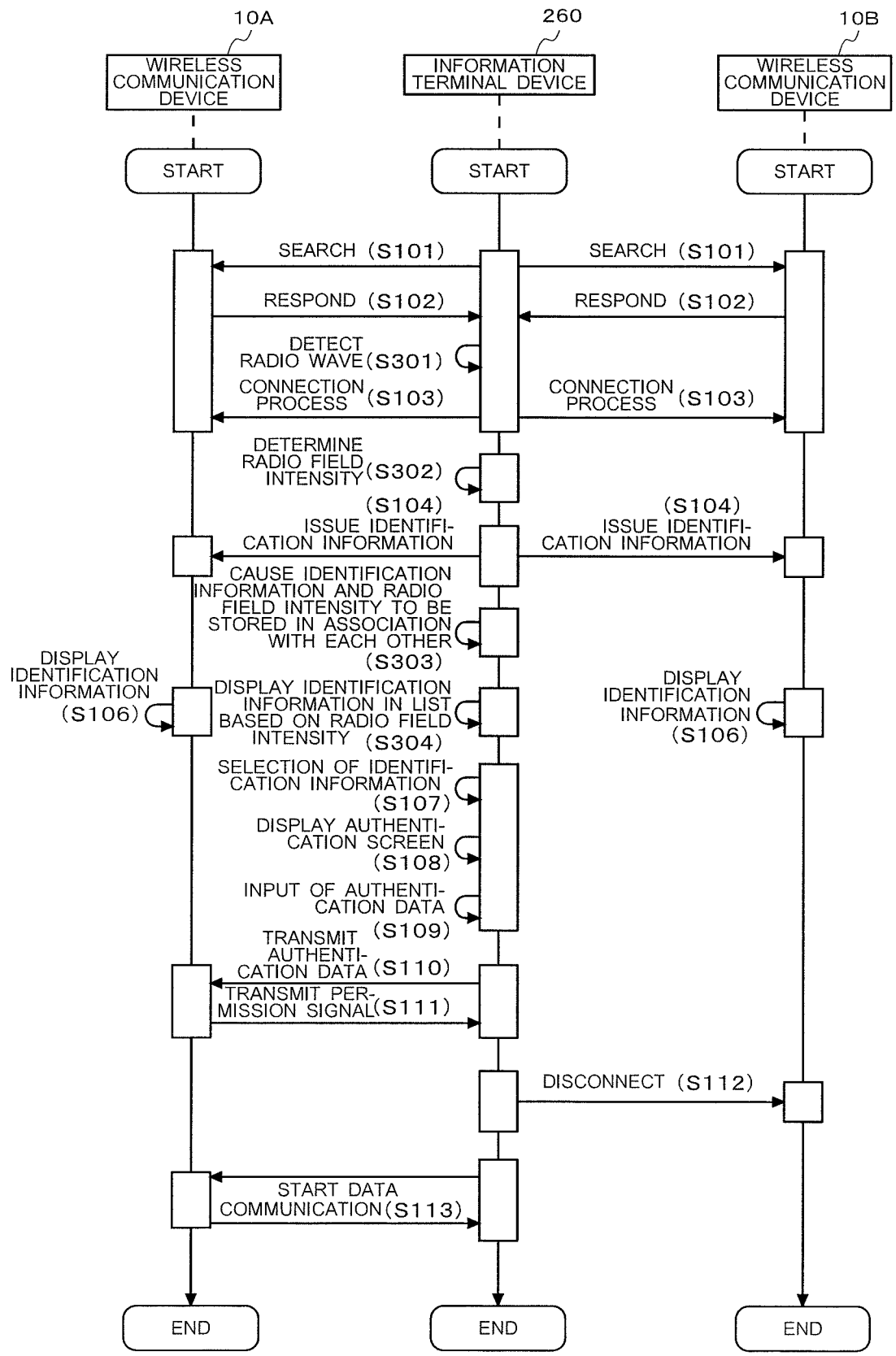
FIG. 14 is a sequence chart showing an operation of the wireless communication system in FIG. 13.

FIG. 14 is a sequence chart showing an operation of the wireless communication system in FIG. 13. An operation of the wireless communication system 100 of Embodiment 5 will be described with reference to FIG. 14, while assuming the same state as in FIG. 4. The same steps as those in FIGS. 4 and 10 described above are denoted by same reference signs, and a description thereof is omitted.

First, the wireless communication system 100 performs the processes in steps S101 and S102 in the same manner as in FIG. 4. At this time, the terminal wireless communication unit 280 detects radio waves for wireless communication by the wireless communication devices 10A and 10B that are present within the searchable range (step S301).

Next, the terminal wireless communication unit 280 performs a connection process for the wireless communication devices 10A and 10B (step S103). The field intensity calculation unit 95 determines the field intensity of each of the wireless communication devices 10A and 10B based on the radio waves detected by the terminal wireless communication unit 280 (step S302). The identification information issuing unit 292 issues and transmits identification information to each of the wireless communication devices 10A and 10B (step S104). The identification information issuing unit 292 also causes the identification information and information on the field intensity to be stored in the terminal storage unit 93, in association with each other, for each of the wireless communication devices 10A and 10B (step S303).

The terminal display processing unit 291 causes the terminal display unit 71 to display, in a list, the identification information of each of the wireless communication devices 10A and 10B based on the field intensity of each of the wireless communication devices 10A and 10B. In other words, the terminal display processing unit 291 causes the terminal display unit 71 to display the identification information of each of the wireless communication devices 10A and 10B in such a manner that, of the wireless communication devices 10A and 10B, one with a larger field intensity is displayed on top, and one with a smaller field intensity is displayed on bottom (step S304). Then, the wireless communication system 100 performs the processes from steps S107 to S113 in the same manner as in FIG. 4.

As described above, with the wireless communication system 100 of Embodiment 5, the wireless communication device is selected based on the field intensity, and ease of operation for the user may be enhanced, and thus, swift data communication may be realized without requiring the user to perform a burdensome operation. With the wireless communication system 100 of Embodiment 5, pieces of identification information of the plurality of wireless communication devices 10 are displayed in a list in the descending order from the largest field intensity. In other words, with the wireless communication system 100, by sorting the identification information based on the field intensity of each of the plurality of wireless communication devices 10, the identification information of the wireless communication device 10 that is closely related to the user in respect of position and operation of which is highly likely to be desired by the user may be displayed at a high position. Accordingly, the user can easily specify the identification information of the wireless communication device 10 that is closely related to the user in respect of position, and the identification information of the wireless communication device 10 connected to the air-conditioning apparatus 200, which is desired to be operated, may be even more easily selected. For example, in the case where four remote controls for air-conditioning apparatuses are provided in a room as the wireless communication devices 10, the user can grasp that pieces of identification information from the top to the fourth on the terminal display unit 71 correspond to the remote controls that are installed in the room. Ease of operation for the user may thus be enhanced.

The terminal display processing unit 291 may cause the terminal display unit 71 to scroll-display a specific number of pieces of identification information. Alternatively, the terminal display processing unit 291 may cause a specific number of pieces of identification information to be displayed, and in a case where the number of pieces of identification information is larger than the specific number, the display screen may be switched according to an operation of the user, for example. According to such a configuration, the number of pieces of identification information that are displayed on the terminal display unit 71 becomes small, and visibility is increased. Moreover, with the wireless communication system 100 of Embodiment 5, the identification information of the wireless communication device 10 that is closely related to the user in respect of position is displayed on top, and thus, the user can specify desired identification information more easily.

In addition to Modifications 1-1 to 1-4 of Embodiment 1 described above, the configuration of each of Embodiments 2 to 4 may be applied to the wireless communication system 100 of Embodiment 5. For example, in the case of applying the configuration of Embodiment 2, information indicating a place in an order of the field intensity may be transmitted from the information terminal device 260 to each wireless communication device 10. This enables each wireless communication device 10 to issue unique identification information that is associated with the field intensity.

Modification 5-1

Figure 15:
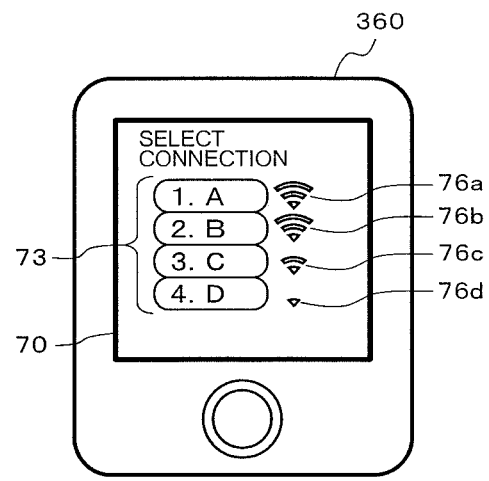
FIG. 15 is an explanatory diagram showing an example of a state where identification information and field intensity data are displayed on an information terminal device in the wireless communication system according to Modification 5-1 of Embodiment 5 of the present invention.

FIG. 15 is an explanatory diagram showing an example of a state where the identification information and field intensity data are displayed on the information terminal device in the wireless communication system 100 according to Modification 5-1 of Embodiment 5 of the present invention. The terminal display processing unit 291 of Modification 5-1 causes the terminal display unit 71 to display identification information of the plurality of wireless communication devices 10, and to also display field intensity data in association with each piece of identification information.

More specifically, in the same state as in FIG. 3, for example, the radio field intensities of the wireless communication devices 10A to 10D are reduced in the order of the wireless communication devices 10A to 10D. Accordingly, the terminal display processing unit 291 causes the terminal display unit 71 to display the pieces of identification information of the wireless communication devices 10A to 10D in a list in the descending order. Furthermore, the terminal display processing unit 291 causes pieces of field intensity data 76a to 76d that are pieces of information indicating levels of the radio field intensities of the wireless communication devices 10A to 10D, respectively, to be displayed at positions, on the terminal display unit 71, corresponding to respective pieces of identification information.

In the example in FIG. 15, the field intensity data indicates the field intensity in four levels, including a non-display state. More specifically, the pieces of field intensity data 76a and 76b of the wireless communication devices 10A and 10B of which the distances from the information terminal device 260 are relatively small, are set to a largest field intensity. The field intensity data 76c of the wireless communication device 10C of which the distance from the information terminal device 260 is larger than that of the wireless communication device 10B, is set to a second largest field intensity. The field intensity data 76d of the wireless communication device 10D of which the distance from the information terminal device 260 is the largest, is set to a third largest field intensity.

In the case where the field intensity data is expressed in four levels of strength, the terminal display processing unit 291 sets the field intensity data using a first threshold, a second threshold, and a third threshold, each corresponding to a level of the field intensity. A relationship of "first threshold<second threshold<third threshold" is established among the first threshold, the second threshold, and the third threshold. In other words, in the case where the field intensity of the wireless communication device 10 is smaller than the first threshold, the terminal display processing unit 291 does not cause the field intensity data to be displayed. In the case where the field intensity of the wireless communication device 10 is at or larger than the first threshold and smaller than the second threshold, the terminal display processing unit 291 causes second-level field intensity data to be displayed, as in the case of the field intensity data 76d. In the case where the field intensity of the wireless communication device 10 is at or larger than the second threshold and smaller than the third threshold, the terminal display processing unit 291 causes third-level field intensity data to be displayed, as in the case of the field intensity data 76c. In the case where the field intensity of the wireless communication device 10 is at or larger than the third threshold, the terminal display processing unit 291 causes fourth-level field intensity data to be displayed, as in the case of the pieces of field intensity data 76a and 76b.

As described above, with the wireless communication system 100 of Modification 5-1, pieces of identification information of the plurality of wireless communication devices 10 are arranged in the descending order from the largest field intensity, and also, field intensity data indicating the level of field intensity is displayed. Accordingly, the ease of specifying the wireless communication device 10 may be further enhanced.

Figure 16:
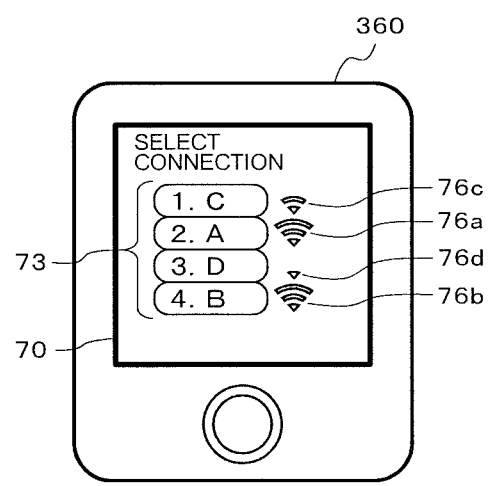
FIG. 16 is an explanatory diagram showing another example of the state where identification information and field intensity data are displayed on the information terminal device in the wireless communication system according to Modification 5-1 of Embodiment 5 of the present invention.

FIG. 16 is an explanatory diagram showing another example of the state where the identification information and the field intensity data are displayed on the information terminal device in the wireless communication system 100 according to Modification 5-1 of Embodiment 5 of the present invention. In Modification 5-1, the field intensity data is displayed together with the identification information, and the user can grasp the field intensity of each wireless communication device 10 based on the field intensity data.

Accordingly, the terminal display processing unit 291 may not necessarily display the pieces of identification information of the wireless communication devices 10 in the order of field intensity. In other words, as in FIG. 16, the pieces of identification information of the wireless communication devices 10 may be randomly displayed, and the pieces of field intensity data 76a to 76d of the wireless communication devices 10A to 10D may be displayed in association with the respective pieces of identification information. Also in this case, the user can easily select the wireless communication device 10 of which the distance from the information terminal device 260 is small, based on the field intensity data, and convenience may be enhanced.

In FIGS. 15 and 16, the field intensity data that indicates the field intensity in four levels of strength is shown, but such a case is not restrictive, and the field intensity data may indicate the field intensity in three or less levels of strength, or in five or more levels of strength. Furthermore, FIGS. 15 and 16 show the field intensity data that is expressed by concentric arcs, but such a case is not restrictive, and the field intensity data may be expressed in other modes enabling recognition of a plurality of levels.

Embodiment 6

Figure 17:
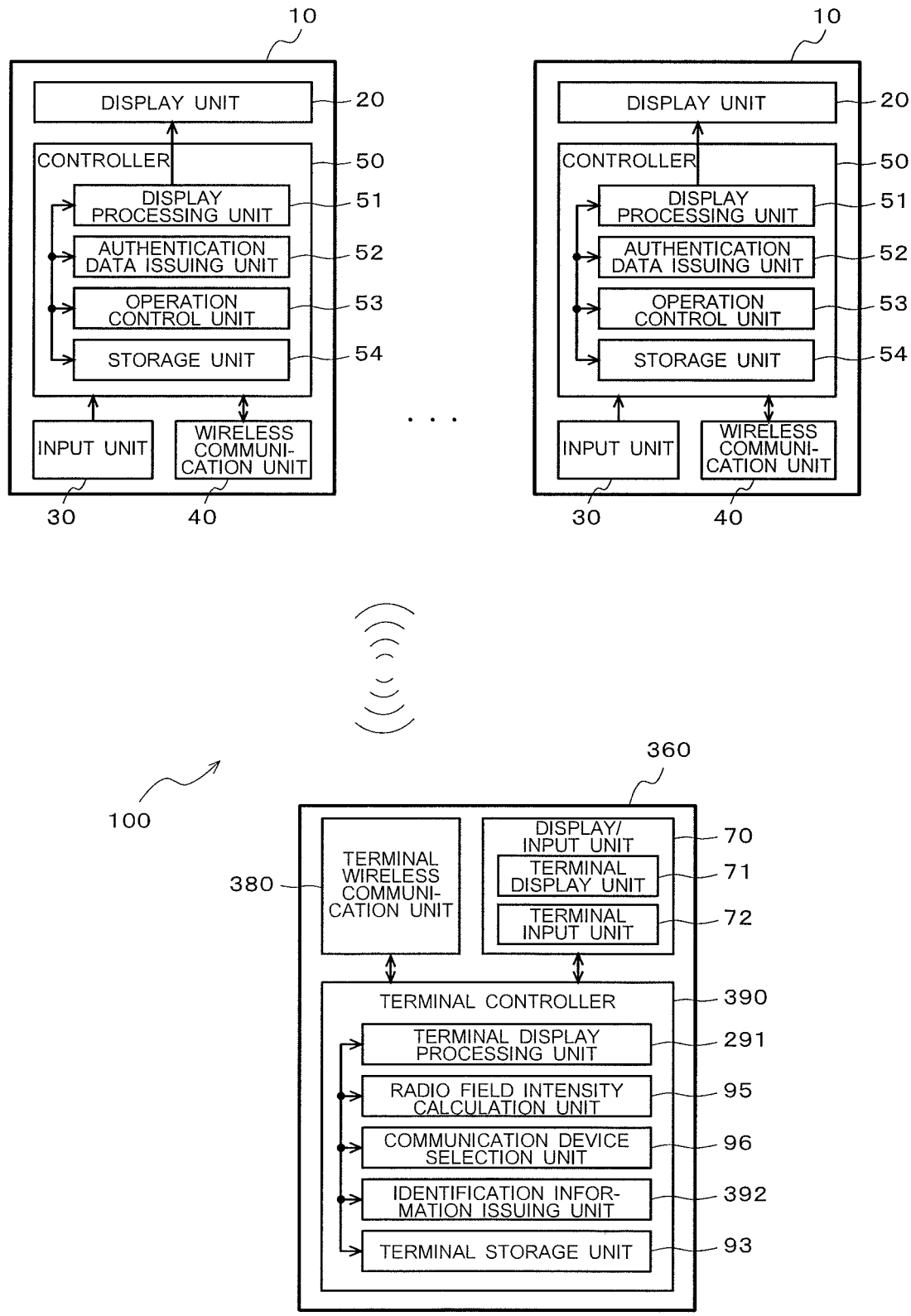
FIG. 17 is a block diagram showing a functional configuration of a wireless communication system according to Embodiment 6 of the present invention.

FIG. 17 is a block diagram showing a functional configuration of a wireless communication system according to Embodiment 6 of the present invention. In each of the embodiments described above, the terminal display unit 71 is caused to display the identification information of all the wireless communication devices that are in a searchable state within the searchable range of the information terminal device. However, when the identification information of all the wireless communication devices within the searchable range is made a target to be displayed in a list, an amount of information that is displayed on the terminal display unit 71 becomes great, and a display size of each piece of identification information becomes small, resulting in lowered visibility and reduced ease of operation.

Accordingly, with the wireless communication system 100 of Embodiment 6, identification information to be displayed on the terminal display unit 71 is selected based on the field intensity of each of the plurality of wireless communication devices 10. The same structural components as those in Embodiment 5 described above are denoted by same reference signs, and a description thereof is omitted.

As shown in FIG. 17, the wireless communication system 100 of Embodiment 6 includes the plurality of wireless communication devices 10, and an information terminal device 360. The information terminal device 360 includes the display/input unit 70, a terminal wireless communication unit 380, and a terminal controller 390. The terminal controller 390 includes the terminal display processing unit 291, the field intensity calculation unit 95, a communication device selection unit 96, an identification information issuing unit 392, and the terminal storage unit 93.

The communication device selection unit 96 selects at least one wireless communication device 10 based on each field intensity determined by the field intensity calculation unit 95. More specifically, the communication device selection unit 96 determines whether the field intensity of each of the plurality of wireless communication devices 10 is at or larger than a radio threshold or not. Then, the communication device selection unit 96 selects the wireless communication device 10 of which the field intensity is at or larger than the radio threshold, from the plurality of wireless communication devices 10.

The identification information issuing unit 392 issues unique identification information for the at least one wireless communication device 10 selected by the communication device selection unit 96. In other words, the identification information issuing unit 392 issues identification information for the wireless communication device 10 of which the field intensity is at or larger than the radio threshold, and does not issue identification information for the wireless communication device 10 of which the field intensity is smaller than the radio threshold. In this manner, the information terminal device 360 takes the identification information of the wireless communication device 10 of which the field intensity is at or larger than the radio threshold, as a display target of the terminal display unit 71, and excludes the identification information of the wireless communication device 10 of which the field intensity is smaller than the radio threshold, from the display target of the terminal display unit 71.

The radio threshold here may be set in advance by an actual apparatus test or the like, and be stored in the terminal storage unit 93. Alternatively, the radio threshold may be dynamically determined by the communication device selection unit 96 based on the field intensity of each of the plurality of wireless communication devices 10 that are installed within the searchable range. In the latter case, the communication device selection unit 96 is configured in the following manner, for example.

That is, the communication device selection unit 96 may determine the radio threshold by subtracting an adjustment coefficient α from a largest field intensity EM. The largest field intensity EM is the largest of the radio field intensities of the plurality of wireless communication devices 10 installed within the searchable range. The adjustment coefficient α takes a positive value that is determined based on an installation environment and the like of the wireless communication system 100.

Furthermore, the communication device selection unit 96 may determine a difference ΔE by subtracting the field intensity from the largest field intensity EM for each of the plurality of wireless communication devices 10. Then, the communication device selection unit 96 may determine whether each field intensity is at or larger than the radio threshold or not, by determining whether the difference ΔE is at or larger than the adjustment coefficient α.

The terminal wireless communication unit 380 performs a connection process for the wireless communication device 10, the field intensity of which is determined by the communication device selection unit 96 to be at or larger than the radio threshold. The terminal wireless communication unit 380 is otherwise configured in the same manner as the terminal wireless communication unit 280 of Embodiment 5.

Figure 18:
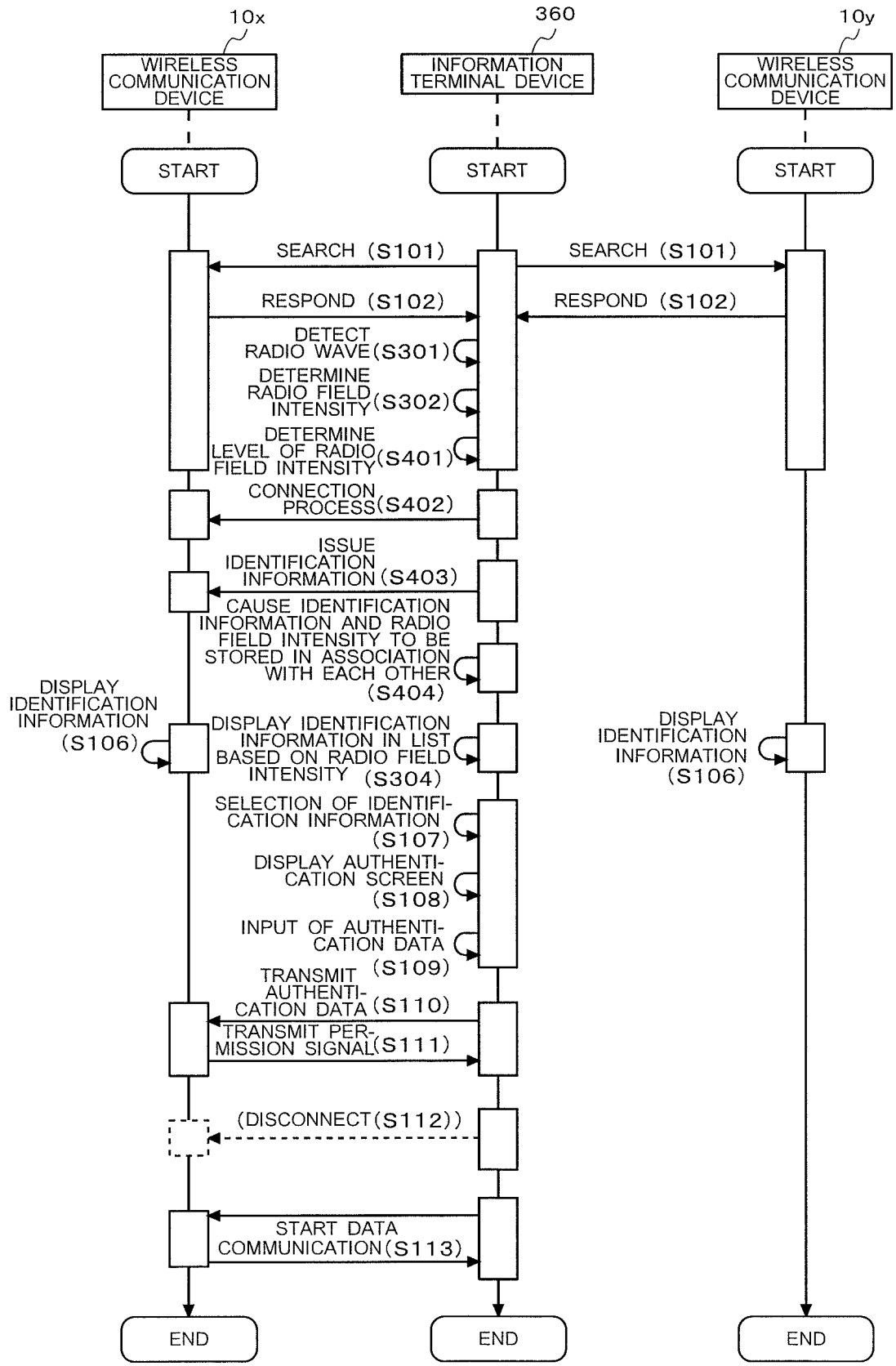
FIG. 18 is a sequence chart showing an operation of the wireless communication system in FIG. 17.

FIG. 18 is a sequence chart showing an operation of the wireless communication system in FIG. 17. FIG. 18 assumes a state where at least one wireless communication device 10x of which the field intensity is at or larger than the radio threshold, and at least one wireless communication device 10y, the field intensity of which is smaller than the radio threshold, are installed within the searchable range of the information terminal device 360. The at least one wireless communication device 10x and the at least one wireless communication device 10y are both in a searchable state. Additionally, for the sake of simplicity, FIG. 18 shows one wireless communication device 10x and one wireless communication device 10y. An operation of the wireless communication system 100 of Embodiment 6 will be described with reference to FIG. 18. The same steps as those in FIG. 14 described above are denoted by same reference signs, and a description thereof is omitted.

First, the wireless communication system 100 performs the processes in steps S101 and S102, and the process in step S301. Then, the field intensity calculation unit 95 determines the field intensity of each of the wireless communication devices 10x and 10y based on the radio waves detected by the terminal wireless communication unit 380 (step S302).

Next, the communication device selection unit 96 determines the level of each field intensity. In other words, the communication device selection unit 96 determines whether each field intensity is at or larger than the radio threshold. The communication device selection unit 96 determines that the field intensity of the at least one wireless communication device 10x is at or larger than the radio threshold, and that the field intensity of the at least one wireless communication device 10y is smaller than the radio threshold (step S401).

Accordingly, the terminal wireless communication unit 380 performs the connection process with respect to the at least one wireless communication device 10x, the field intensity of which is at or larger than the radio threshold (step S402). The identification information issuing unit 392 issues, and transmits, the identification information of the at least one wireless communication device 10x (step S403). The identification information issuing unit 392 also causes the identification information and information on the field intensity to be stored in the terminal storage unit 93 in association with each other for the at least one wireless communication device 10x (step S404).

Then, the wireless communication system 100 performs the processes in steps S304 and from steps S107 to S113 in the same manner as in FIG. 14. Additionally, step S112 is a process of cancelling, in the case where a plurality of wireless communication devices 10x are present within the searchable range, the connected state to the wireless communication device 10x that is not specified in step S107.

As described above, with the wireless communication system 100 of Embodiment 6, since the wireless communication device is selected based on the field intensity, the ease of operation may be increased for the user, and swift data communication may be realized without requiring the user to perform a burdensome operation. With the wireless communication system 100 of Embodiment 6, the identification information of the wireless communication device 10 of which the field intensity relatively large is displayed, and the identification information of the wireless communication device 10 of which the field intensity is relatively small is not displayed. In other words, the wireless communication system 100 displays only the identification information of the wireless communication device 10 that is closely related to the user in respect of position, and does not display the identification information of the wireless communication device 10 that is not closely related to the user in respect of position. Accordingly, the wireless communication device 10 that is estimated to be in an adjacent room or in an upstairs or downstairs room may be excluded from the display target. In other words, a situation where the wireless communication device 10 that is not closely related to the user in respect of position, such as a remote control in an adjacent room, is selected, and facility equipment connected to such a wireless communication device 10 is operated may be avoided. Moreover, since the amount of information displayed on the terminal display unit 71 may be reduced, the visibility and the ease of operation may be enhanced.

Furthermore, with the wireless communication system 100 of Embodiment 6, the connection process is not performed and the identification information is not issued for the wireless communication device 10 that is not closely related to the user in terms of position. Accordingly, a load on the information terminal device 360 related to arithmetic processing may be reduced, and also, an amount of wireless communication may be reduced.

An example is described above where the terminal display processing unit 291 causes display to be performed in order from the largest field intensity, based on the field intensity of each of the plurality of wireless communication devices 10, but such an example is not restrictive. In other words, the terminal display processing unit 291 may cause the identification information of the wireless communication device 10 of which the field intensity is at or larger than the radio threshold to be randomly displayed. Also in this case, the identification information of the wireless communication device 10 that is not closely related to the user in respect of position is excluded, and thus, the visibility and the ease of operation are enhanced than in a case where the identification information of all the wireless communication devices 10 within the searchable range is displayed. Additionally, the configuration of Modification 5-1 described above may be applied to the wireless communication system 100 of Embodiment 6. Moreover, in addition to Modifications 1-1 to 1-4 of Embodiment 1 described above, the configuration of each of Embodiments 2 to 4 may be applied to the wireless communication system 100 of Embodiment 6.

Modification 6-1

Figure 19:
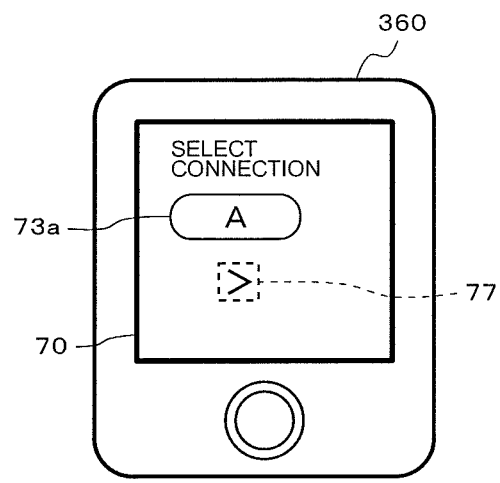
FIG. 19 is an explanatory diagram showing an example of a state where identification information is displayed on an information terminal device in the wireless communication system according to Modification 6-1 of Embodiment 6 of the present invention.
Figure 20:
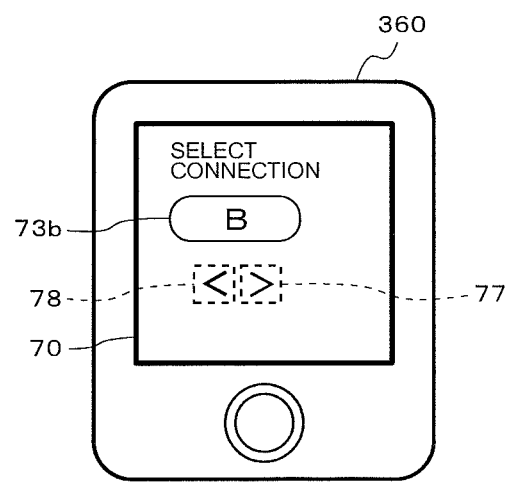
FIG. 20 is an explanatory diagram showing another example of the state where identification information is displayed on the information terminal device in the wireless communication system according to Modification 6-1 of Embodiment 6 of the present invention.

FIG. 19 is an explanatory diagram showing an example of a state where the identification information is displayed on the information terminal device in the wireless communication system 100 according to Modification 6-1 of Embodiment 6 of the present invention. FIG. 20 is an explanatory diagram showing another example of the state where the identification information is displayed on the information terminal device in the wireless communication system 100 according to Modification 6-1 of Embodiment 6 of the present invention.

The terminal display processing unit 391 of Modification 6-1 causes the terminal display unit 71 to display the identification information of one specific wireless communication device 10. More specifically, the terminal display processing unit 391 first causes the terminal display unit 71 to display the identification information of only the wireless communication device 10 with the largest field intensity within the searchable range.

When assuming the same state as that shown in FIG. 3, the terminal display processing unit 391 causes the terminal display unit 71 to display identification information 73a of the wireless communication device 10A of which the field intensity is the largest among those of the wireless communication devices 10A to 10D, as shown in FIG. 19. At this time, the terminal display processing unit 391 causes a "next" button 77 as shown in FIG. 19 to be additionally displayed. The "next" button 77 is a virtual button for causing transition to a screen displaying the identification information of the wireless communication device 10, the field intensity is the next largest to that of the wireless communication device 10 corresponding to the identification information on the display screen. In other words, when the user touches the "next" button 77 in FIG. 19 in the same state as in FIG. 3, transition to a display screen as shown in FIG. 20 takes place.

On the terminal display unit 71 in FIG. 20, identification information 73*b* of the wireless communication device 10B, the field intensity of which is the next largest to that of the wireless communication device 10A, the "next" button 77, and a "return" button 78 are displayed. The "return" button 78 is a virtual button for returning a currently displayed screen on the terminal display unit 71 to an immediately preceding display screen. In other words, when the user touches the "return" button 78 in FIG. 20 in the same state as that shown in FIG. 3, transition to a display screen as shown in FIG. 19 takes place. On the other hand, when the user touches the "next" button 77 in FIG. 20, transition to a display screen displaying the identification information of the wireless communication device 10C of which the field intensity which is the next largest to that of the wireless communication device 10B, the "next" button 77, and the "return" button 78 takes place.

The operation of touching the "next" button 77 that is performed by the user at this time corresponds to a rejection operation of rejecting specification of the wireless communication device 10 selected by the communication device selection unit 96. The communication device selection unit 96 of Modification 6-1 is configured to select, when the rejection operation is received by the terminal input unit 72, the wireless communication device 10 of which the field intensity is the next largest to that of a previously selected wireless communication device 10.

As described above, with the wireless communication system 100 of Modification 6-1, the identification information of the wireless communication device 10 of which the field intensity is the largest among those of the plurality of wireless communication devices 10 installed within the searchable range is first displayed. The user is assumed to operate the information terminal device 360 at a position relatively close to the wireless communication device 10 that is desired to be selected, and thus, the field intensity of the wireless communication device 10 that is desired to be selected is highly likely to be the largest. Accordingly, with the wireless communication system 100 of Modification 6-1, the user is enabled to swiftly select the desired wireless communication device 10 on an easy-to-operate display screen of the terminal display unit 71, displaying a small amount of information.

Furthermore, with the wireless communication system 100, the identification information is displayed one by one, in the descending order, from that of the wireless communication device 10 of which the field intensity is the largest among those of the plurality of wireless communication devices 10 installed within the searchable range. For example, in the case where the user does not wish to select the wireless communication device 10 with the largest radio wave, the user can touch the "next" button 77, and cause the identification information of the wireless communication device 10 with the next largest field intensity to be displayed. In other words, convenience of the user may be increased by a display adjustment process for the identification information based on a positional relationship to the user.

The characteristic configuration of Modification 1 or Modification 2 of Embodiment 1, or Embodiment 3 described above may be applied to the wireless communication system 100 of Modification 6-1. In other words, the wireless communication system 100 of Modification 6-1 may be configured such that the display unit 20 or the light-emitting unit 220 is caused to emit light according to a selection operation on the display/input unit 70. Moreover, the characteristic configuration of Embodiment 4 described above may be applied to the wireless communication system 100 of Modification 6-1. In other words, with the wireless communication system 100 of Modification 6-1, the notification unit 320 may output a sound in accordance with a selection operation on the display/input unit 70.

Modification 6-2

Figure 22:
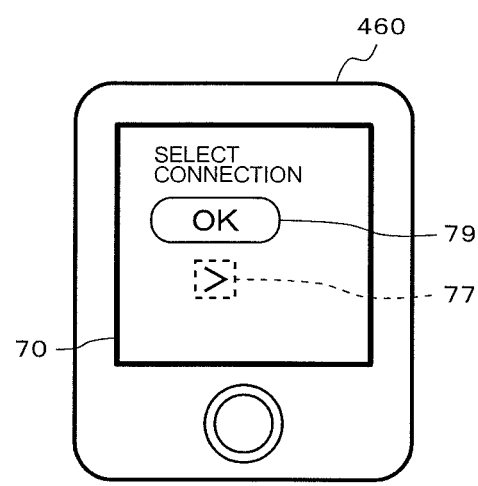
FIG. 22 is an explanatory diagram showing an example of a display screen of an information terminal device in the wireless communication system in FIG. 21.

FIG. 21 is a block diagram showing a functional configuration of the wireless communication system according to Modification 6-2 of Embodiment 6 of the present invention. FIG. 22 is an explanatory diagram showing an example of a display screen of an information terminal device in the wireless communication system in FIG. 21.

Embodiment 3 described above describes a configuration according to which, when the user performs a selection operation, the light-emitting unit 220 of the wireless communication device 10 for which the selection operation is performed emits light. On the other hand, with the wireless communication system 100 of Modification 6-2, the light-emitting unit 220 of one wireless communication device 410 is caused to automatically emit light, based on the field intensity of each of a plurality of wireless communication devices 410. Components the same as those of each embodiment described above are denoted by same reference signs, and a description thereof is omitted.

As shown in FIG. 21, the wireless communication system 100 of Modification 6-2 includes a plurality of wireless communication devices 410, and an information terminal device 460. The wireless communication device 410 includes, in a controller 450, an output processing unit 451 including the display processing unit 51 and a light-emission processing unit 455. The information terminal device 460 includes the display/input unit 70, a terminal wireless communication unit 480, and a terminal controller 490. The terminal controller 490 includes a terminal display processing unit 491, the field intensity calculation unit 95, a communication device selection unit 496, a light-emission command processing unit 97, and the terminal storage unit 93.

The communication device selection unit 496 compares the radio field intensities of the plurality of wireless communication devices 410 installed within the searchable range, and selects the wireless communication device 410 with the largest field intensity. The communication device selection unit 496 outputs a display command instructing the terminal display processing unit 491 to display an approval screen, when the wireless communication device 410 with the largest field intensity is selected. The light-emission command processing unit 97 transmits a light-emission command signal to the wireless communication device 410 selected by the communication device selection unit 496.

The communication device selection unit 496 further selects the wireless communication device 410 of which the field intensity is the next largest to that of the wireless communication device 410 to which the light-emission command signal is transmitted in accordance with a selection command from the terminal display processing unit 491. Whenever the communication device selection unit 496 selects the wireless communication device 410, the light-emission command processing unit 97 transmits the light-emission command signal to the selected wireless communication device 410. The light-emission processing unit 455 causes the light-emitting unit 220 to emit light, according to the light-emission command signal transmitted from the light-emission command processing unit 97. In other words, in Modification 6-2, the light-emitting unit 220 of each of the plurality of wireless communication devices 410 emits light when the wireless communication device 410 is selected by the communication device selection unit 496.

The terminal display processing unit 491 causes an approval screen as shown in FIG. 22, for example, to be displayed on the terminal display unit 71, according to the display command from the communication device selection unit 496. An "OK" button 79 and the "next" button 77 are displayed on the approval screen in FIG. 22. The "OK" button 79 is a virtual button for causing transition to the connection process with the wireless communication device 410 selected by the communication device selection unit 496. The "next" button 77 in Modification 6-2 is a virtual button for causing the wireless communication device 410 with the next largest field intensity to emit light.

That is, when the user touches the "OK" button 79, the terminal display processing unit 491 performs the connection process to the wireless communication device 410 selected by the communication device selection unit 496, via the terminal wireless communication unit 480. On the other hand, when the user touches the "next" button 77, the terminal display processing unit 491 outputs, to the communication device selection unit 496, a selection command for urging selection of the wireless communication device with the next largest field intensity. The terminal display processing unit 491 is otherwise configured in the same manner as the terminal display processing unit 91, 191, or 291 described above.

The operation of touching the "next" button 77 that is performed by the user at this time corresponds to a rejection operation of rejecting specification of the wireless communication device 410 selected by the communication device selection unit 496. The communication device selection unit 496 of Modification 6-2 is configured to select, when the rejection operation is received by the terminal input unit 72, the wireless communication device 410 of which the field intensity is the next largest to that of a previously selected wireless communication device 10. Additionally, the "OK" button 79 of Modification 6-2 is configured to identify the one wireless communication device 410 that is selected by the communication device selection unit 496, and thus, corresponds to "identification information" of the present invention.

As described above, with the wireless communication system 100 of Modification 6-2, the wireless communication devices 410 automatically emit light in a descending order from the one with the largest field intensity. Accordingly, a connection process between the wireless communication device 410 that is desired to be selected by the user, and the information terminal device 460 that is carried by the user may be swiftly performed, without display or issuance of identification information. In other words, the wireless communication system 100 causes the wireless communication device 410 with the largest field intensity, among the plurality of wireless communication devices 410 installed within the searchable range, to emit light. This enables the user to swiftly specify the wireless communication device 410 that is closely related to the user in position. Moreover, the wireless communication system 100 causes the wireless communication devices 410 to emit light in the descending order from the one with the largest field intensity, according to an input operation of the user. Accordingly, the user can swiftly issue an instruction to perform the connection process by checking light emission by the desired wireless communication device 410.

However, the wireless communication system 100 of Modification 6-2 may be configured without including the light-emitting unit 220, as in Modification 1-1 of Embodiment 1, and the display processing unit 51 may cause the display unit 20 to emit light, at a same timing as the light-emission processing unit 455. In other words, the display unit 20 of the wireless communication device 410 may emit light when the wireless communication device 410 is selected by the communication device selection unit 496. Furthermore, the notification unit 320 in Embodiment 4 may be provided at the wireless communication device 410. In this case, the notification unit 320 may output a sound when the wireless communication device 410 is selected by the communication device selection unit 496.

Modification 6-3

Figure 23:
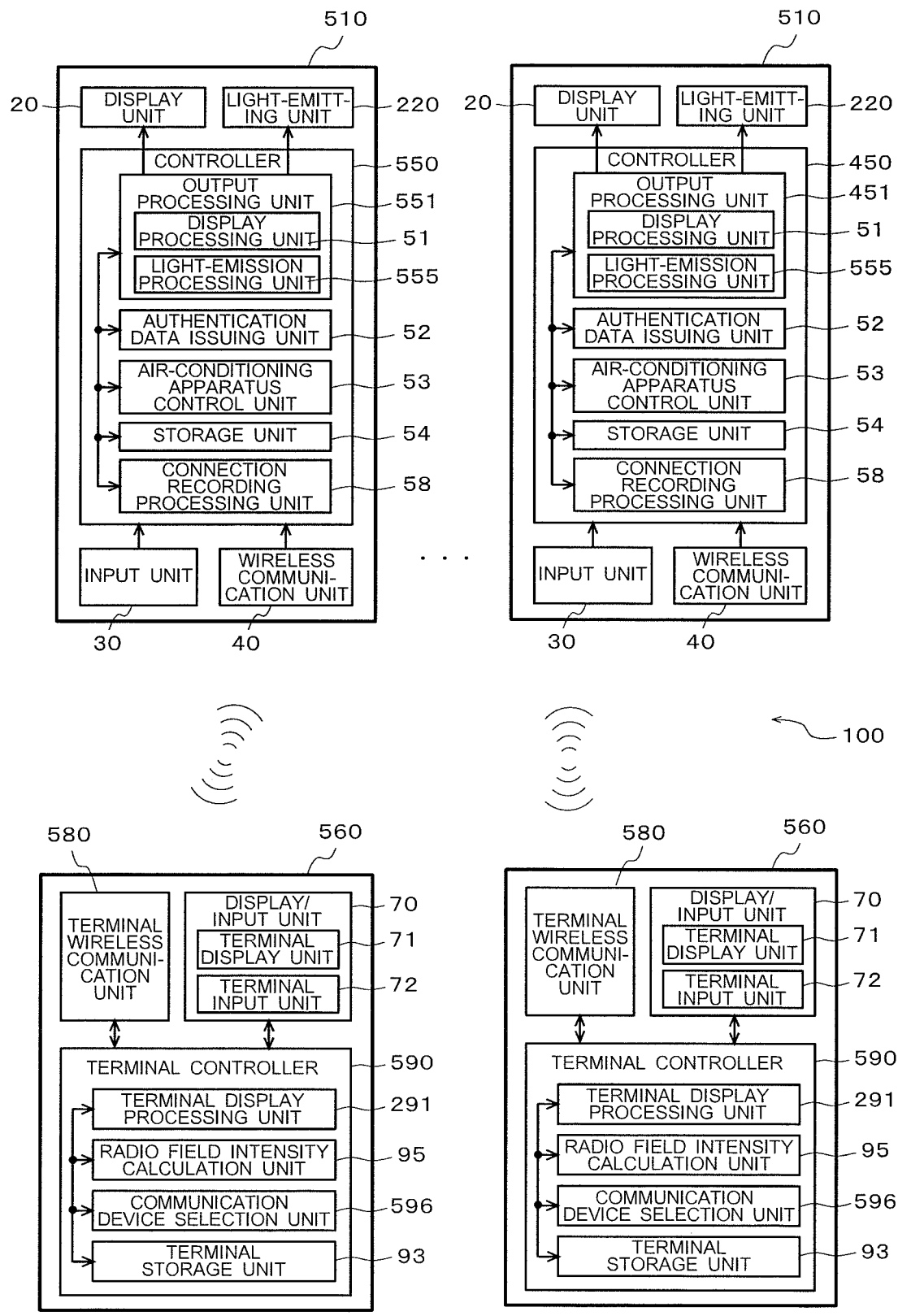
FIG. 23 is a block diagram showing a functional configuration of a wireless communication device in the wireless communication system according to Modification 6-3 of Embodiment 6 of the present invention.

FIG. 23 is a block diagram showing a functional configuration of a wireless communication device in the wireless communication system according to Modification 6-3 of Embodiment 6 of the present invention. As shown in FIG. 23, Modification 6-3 is for a case where the wireless communication system 100 includes a plurality of wireless communication devices 510, and a plurality of information terminal devices 560. The same components as those of each embodiment described above are denoted by same reference signs, and a description thereof is omitted.

The wireless communication device 510 includes, in a controller 550, an output processing unit 551 including the display processing unit 51 and the light-emission processing unit 555, and a connection recording processing unit 58. The information terminal device 560 includes a communication device selection unit 596 in a terminal controller 590.

The connection recording processing unit 58 causes the storage unit 54 to sequentially store history data that is information on the information terminal device 560 that is wirelessly connected via the wireless communication unit 40. The history data is information on a connection history indicating that the connection recording processing unit 58 is "connected to an information terminal device 560 on (month) (day)", for example.

Furthermore, when the information terminal device 560 issues an inquiry as to whether a connection process may be performed or not, the connection recording processing unit 58 determines whether or not the information terminal device 560 is a device that performed wireless connection within a set period of time. The set period of time here is set to "one day", for example, but may be changed as appropriate. In the case where the information terminal device 560 that issued the inquiry is a device that performed wireless connection within the set period of time, the connection recording processing unit 58 outputs the light-emission command signal to the light-emission processing unit 555. The light-emission processing unit 555 causes the light-emitting unit 220 to be lighted in accordance with the light-emission command signal from the connection recording processing unit 58.

Moreover, at the time of outputting the light-emission command signal to the light-emission processing unit 555, the connection recording processing unit 58 transmits past connection data regarding the information terminal device 560 to the information terminal device 560. The connection data is information indicating that that connection with the wireless communication device 510 that transmitted the connection data is previously performed.

In the case where the connection data is transmitted from one wireless communication device 510, the communication device selection unit 596 performs the connection process to the wireless communication device 510 via the terminal wireless communication unit 580. In the case where the connection data is transmitted from a plurality of wireless communication devices 510, the communication device selection unit 596 compares the radio field intensities of the plurality of wireless communication devices 510. Then, the communication device selection unit 596 performs the connection process to the wireless communication device 510 with the largest field intensity via the terminal wireless communication unit 580. In other words, the communication device selection unit 596 includes a history extraction function of extracting, by referring to the history data of each of the plurality of wireless communication devices 510, the wireless communication device 510 with which connection is previously performed. Then, when a plurality of wireless communication devices 510 are extracted by the history extraction function, the communication device selection unit 596 selects one with the largest field intensity among the wireless communication devices.

Figure 24:
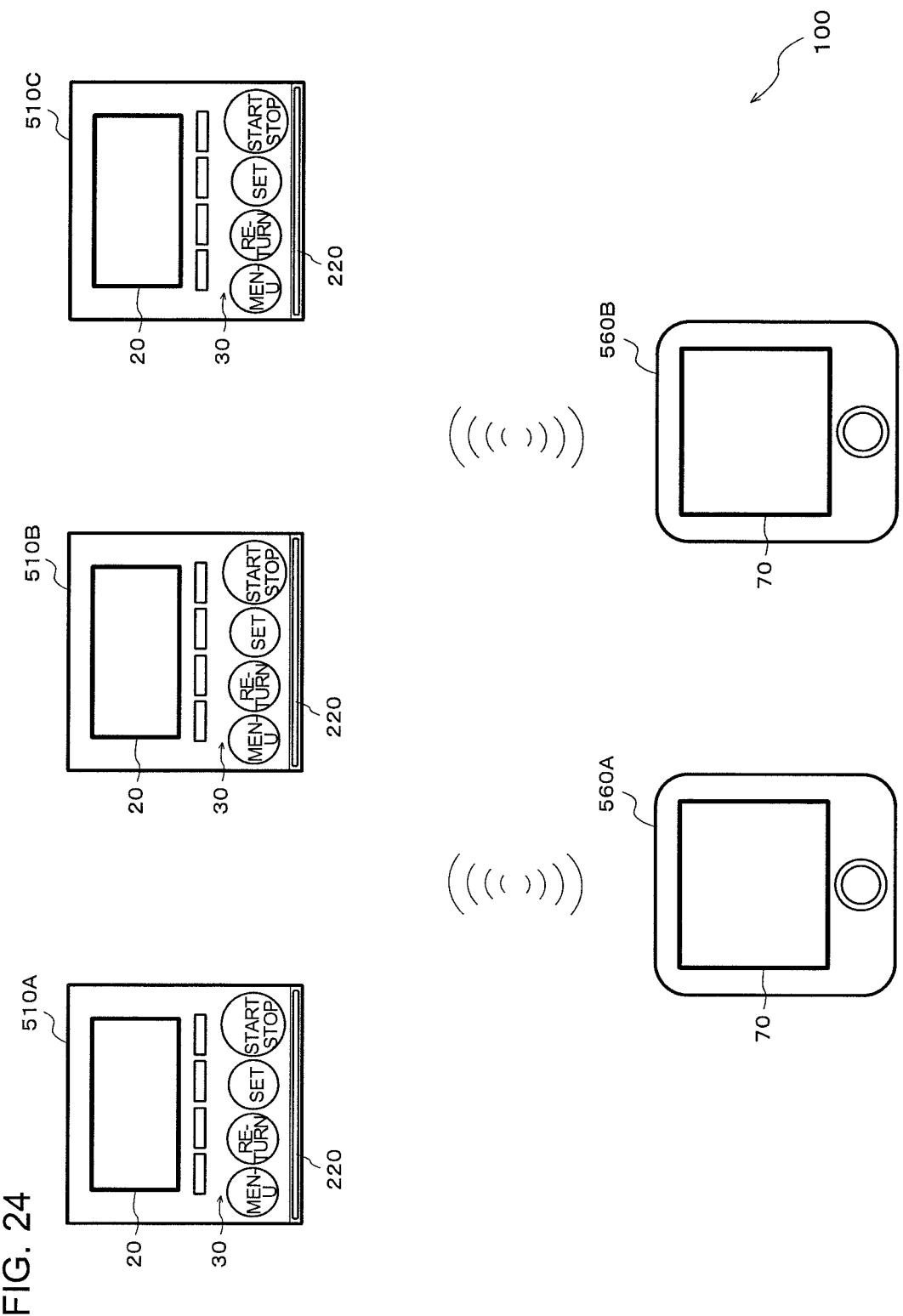
FIG. 24 is an explanatory diagram showing an example configuration of the wireless communication system in FIG. 23.

FIG. 24 is an explanatory diagram showing an example configuration of the wireless communication system in FIG. 23. In FIG. 24, an information terminal device 560A and an information terminal device 560B are shown as the plurality of information terminal devices 560. Moreover, wireless communication devices 510A to 510C are shown as the plurality of wireless communication devices 510. The wireless communication devices 510A to 510C each sequentially store history data such as "connected to information terminal device 560A on (month) (day)" or "connected to information terminal device 560B on (month) (day)". Specific processing of the wireless communication system 100 will be described with reference to FIG. 24, assuming a case where the wireless communication devices 510A to 510C and the information terminal devices 560A and 560B perform wireless communication by Bluetooth.

First, a state is assumed where the wireless communication device 510C is installed within the searchable range of the information terminal device 560A, and the wireless communication devices 510A and 510B are installed outside the searchable range of the information terminal device 560A. For example, when the information terminal device 560A is put in Bluetooth connection mode in this state, it is assumed that the information terminal device 560A is a device that Bluetooth-connected to the wireless communication device 510C within the set period of time. Then, the wireless communication device 510C causes the light-emitting unit 220 to be lighted, and also, transmits the past connection data regarding the information terminal device 560A to the information terminal device 560. The connection data here is information indicating that connection to the wireless communication device 510C is previously performed. Accordingly, due to transmission of the connection data from the wireless communication device 510C, the information terminal device 560A may recognize that the information terminal device 560A previously connected to the wireless communication device 510C, and thus, Bluetooth connection to the wireless communication device 510C is automatically made.

Next, a state is assumed where the wireless communication devices 510B and 510C are installed within the searchable range of the information terminal device 560A, and the wireless communication device 510A is installed outside the searchable range of the information terminal device 560A. It is further assumed that, when the information terminal device 560A is placed in the Bluetooth connection mode, the information terminal device 560A becomes a device that Bluetooth-connected to both the wireless communication device 510C and the wireless communication device 510B within the set period of time. Then, as in the case described above, the wireless communication device 510C transmits the past connection data regarding the information terminal device 560A to the information terminal device 560A. The wireless communication device 510B also transmits the past connection data regarding the information terminal device 560A to the information terminal device 560A. Accordingly, the information terminal device 560A recognizes that the information terminal device 560A previously connected to both the wireless communication device 510B and the wireless communication device 510C.

In the case where the connection data is transmitted from two or more wireless communication devices 510 in the manner described above, the information terminal device 560 automatically makes Bluetooth connection to one with the larger field intensity among the two or more wireless communication devices 510. In other words, in the state in FIG. 24, the distance from the information terminal device 560A is smaller for the wireless communication device 510B than for the wireless communication device 510C. Accordingly, the information terminal device 560A automatically makes Bluetooth connection to the wireless communication device 510B with relatively large field intensity, without an operation by the user.

As described above, the information terminal device 560 of Modification 6-3 performs the connection process to one with the largest field intensity, among the wireless communication devices 510 with which connection is previously made. Accordingly, with the wireless communication system of Modification 6-3, swift automatic connection to the wireless communication device 510 that is closely related to the user in respect of position may be performed, without display or issuance of identification information.

The information terminal device 560 may include the identification information issuing unit 92, 292, 392, or 492, and the terminal display processing unit 291 may cause the terminal display unit 71 to display the identification information. At this time, the terminal display processing unit 291 may display highlight information in association with the identification information of the wireless communication device 510 that is the transmission source of the connection data. The highlight information may be a mark such as "*" or may be a message, for example.

However, the wireless communication system 100 of Modification 6-3 may be configured without including the light-emitting unit 220, as in Modification 1-1 of Embodiment 1, and the display processing unit 51 may cause the display unit 20 to emit light, at a same timing as the light-emission processing unit 455. Moreover, in the case where the wireless communication device 510 includes the notification processing unit 56 and the notification unit 320, as in Embodiment 4, the notification unit 320 may be caused to output a sound instead of or in addition to light emission by the light-emitting unit 220.

Furthermore, a configuration may also be adopted in which the wireless communication device 510 does not cause the light-emitting unit 220 to be lighted, even when the information terminal device 560 that is put in the connection mode is a device that performed connection within the set period of time. In this case, the wireless communication device 510 does not have to include the light-emission processing unit 555 and the light-emitting unit 220. Moreover, the information terminal device 560 may include the terminal display processing unit 91 instead of the terminal display processing unit 291.

Embodiment 7

Figure 25:
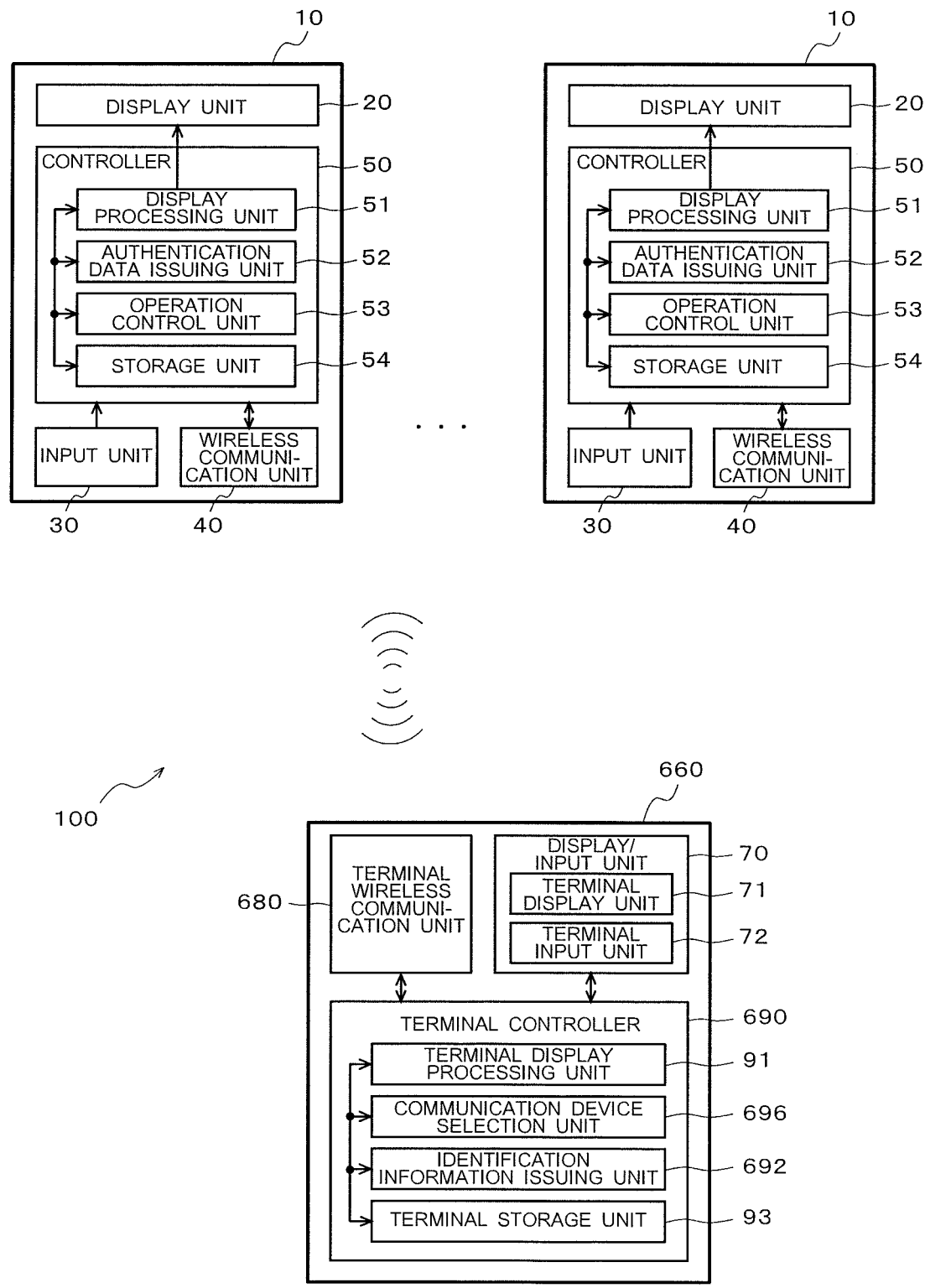
FIG. 25 is a block diagram showing a functional configuration of an information terminal device in a wireless communication system according to Embodiment 7 of the present invention.

FIG. 25 is a block diagram showing a functional configuration of an information terminal device in the wireless communication system according to Embodiment 7 of the present invention. Each embodiment described above shows a case where a remote control for operating an air-conditioning apparatus is installed, within a searchable range of an information terminal device, as a wireless communication device that is in a searchable state. However, a case is also conceivable where a device other than the remote control for operating an air-conditioning apparatus is installed, within the searchable range of the information terminal device, as the wireless communication device that is in a searchable state. As such a device, a remote control for operating a Bluetooth-compatible headset, speaker, mouse, or lighting equipment, such as a ceiling light, is conceivable. When identification information of such other devices is made a target of list display, the amount of information displayed on the terminal display unit 71 is increased, and the visibility and the ease of operation are deteriorated due to a display size of each piece of identification information being reduced.

Accordingly, the wireless communication system 100 of Embodiment 7 causes only the identification information of an information terminal device corresponding to facility equipment of a specific type to be displayed on the terminal display unit 71. The same components as those of each embodiment described above are denoted by same reference signs, and a description thereof is omitted.

As shown in FIG. 25, the wireless communication system 100 of Embodiment 7 includes the plurality of wireless communication devices 10, and an information terminal device 660. The information terminal device 660 includes the display/input unit 70, a terminal wireless communication unit 680, and a terminal controller 690.

The plurality of wireless communication devices 10 each includes device identification data including characteristic information that is common among a same type of devices. The wireless communication device 10 that is in a searchable state transmits a response signal including the device identification data in response to an inquiry from the information terminal device 660 as to whether a connection process may be performed or not. The response signal here is obtained by adding the device identification data to a signal indicating that the connection process may be performed.

The terminal controller 690 includes the terminal display processing unit 91, a communication device selection unit 696, an identification information issuing unit 692, and the terminal storage unit 93. The communication device selection unit 696 determines, based on the device identification data that is transmitted from the wireless communication device 10 that is in a searchable state, whether or not the wireless communication device 10 is a communication target device that is a target with which data communication is to be performed.

The communication target device here is the wireless communication device 10 that is compatible with a remote operation program, and in Embodiment 7, a case is assumed where the communication target device is a remote control configured to operate an air-conditioning apparatus of a same type. The remote operation program of Embodiment 7 includes a program configured to cause the terminal controller 690 to perform a target extraction function. The target extraction function is a function of extracting the wireless communication device 10 that includes the device identification information including the characteristic information indicating that the wireless communication device 10 is a target with which data communication is to be performed. In the following, the characteristic information indicating a device to be a target with which data communication is to be performed will also be referred to as "target characteristic information".

The wireless communication device 10 compatible with the remote operation program includes the device identification information having a format such as "ACR-***", for example. In this case, "ACR" is the characteristic information indicating that the wireless communication device is the communication target device, or in other words, the target characteristic information.

In Embodiment 7, the communication device selection unit 696 operates according to the remote operation program stored in the terminal storage unit 93 to thereby implement the target extraction function. In other words, the communication device selection unit 696 determines whether the wireless communication device 10 that is in a searchable state is a target of list display or not, by determining whether the device identification data transmitted from the wireless communication device 10 includes the target characteristic information or not.

The terminal wireless communication unit 680 performs mutual authentication with at least one wireless communication device 10 that is determined by the communication device selection unit 696 to be the target of list display, among the plurality of wireless communication devices 10, and performs the connection process. The terminal wireless communication unit 680 is otherwise configured in the same manner as the terminal wireless communication unit 80 of Embodiment 1.

The identification information issuing unit 692 issues the identification information of the at least one wireless communication device 10 that is determined by the communication device selection unit 696 to be the target of list display, among the plurality of wireless communication devices 10. The identification information issuing unit 692 is otherwise configured in the same manner as the identification information issuing unit 92 of Embodiment 1. The terminal display processing unit 91 thereby causes the terminal display unit 71 to display only the identification information of the wireless communication device 10 that is compatible with the remote operation program.

Figure 26:
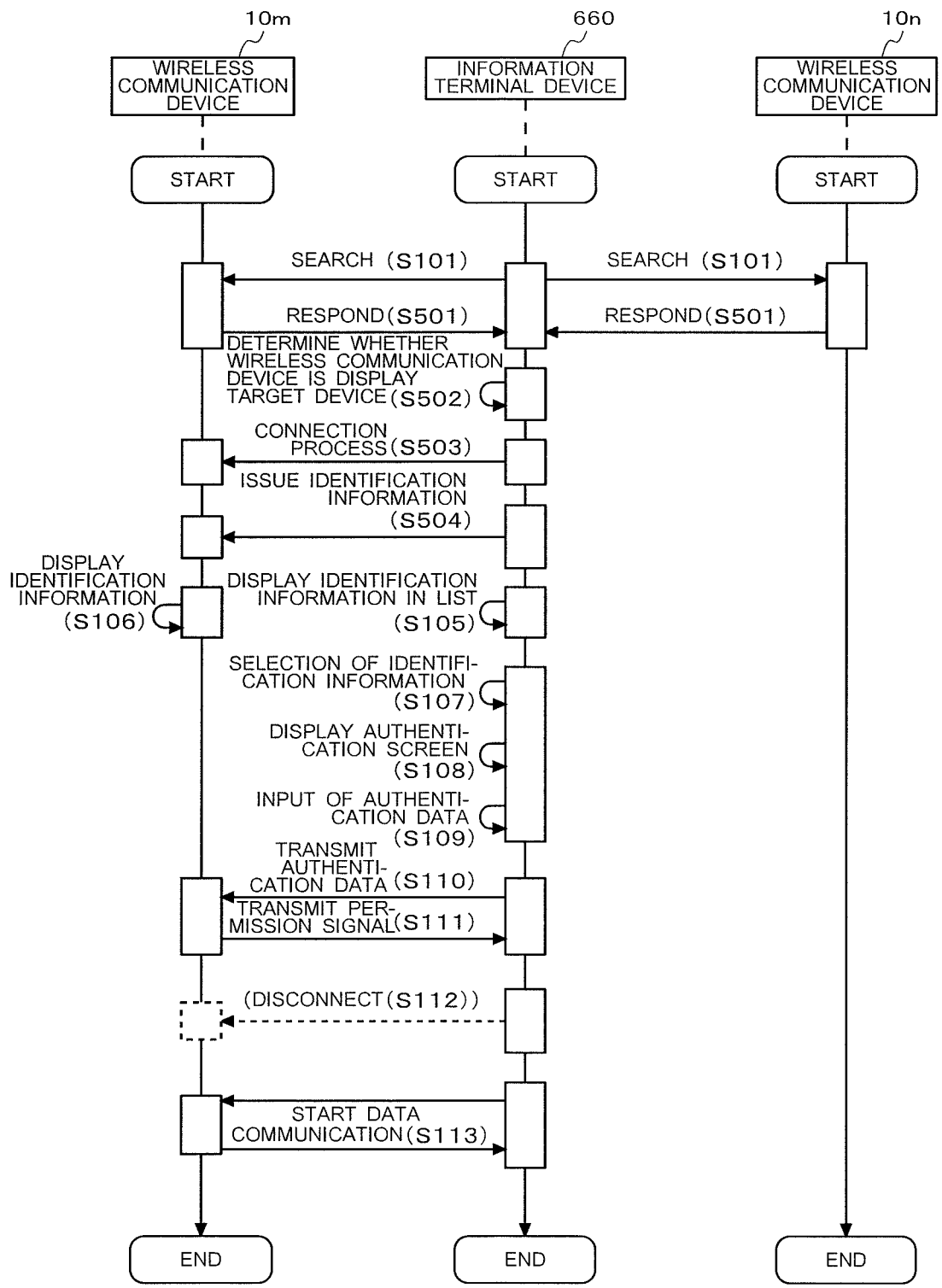
FIG. 26 is a sequence chart showing an operation of the wireless communication system in FIG. 25.

FIG. 26 is a sequence chart showing an operation of the wireless communication system of FIG. 25. In FIG. 26, a state is assumed where a plurality of wireless communication devices 10m that are compatible with the remote operation program, and at least one wireless communication device 10n that is not compatible with the remote operation program are present within the searchable range of the information terminal device 60. The plurality of wireless communication device 10m and the at least one wireless communication device 10n are all in a searchable state. For the sake of simplicity, FIG. 26 shows one wireless communication device 10m and one wireless communication device 10*n*. An operation of the wireless communication system 100 of Embodiment 6 is described below with reference to FIG. 26. The same steps as those in FIGS. 4 and 10 described above are denoted by same reference signs, and a description thereof is omitted.

First, the information terminal device 60 inquires of each of the plurality of wireless communication devices 10, according to an operation of the user, whether the connection process may be performed or not (step S101). Then, the plurality of wireless communication devices 10*m* and the at least one wireless communication device 10*n* each transmit a response signal to which the device identification data is added, in response to the inquiry from the information terminal device 60 (step S501).

Next, the communication device selection unit 696 determines whether each wireless communication device 10 is the communication target device or not, by determining whether the target characteristic information is included in the device identification data transmitted from the wireless communication device 10 or not. Based on the assumption in FIG. 26, the communication device selection unit 696 determines that each of the plurality of wireless communication devices 10*m* is the communication target device (step S502). Accordingly, the terminal wireless communication unit 680 performs mutual authentication with the plurality of wireless communication devices 10*m*, and performs the connection process. The terminal wireless communication unit 680 does not perform mutual authentication with the at least one wireless communication device 10*n* (step S503).

Next, the identification information issuing unit 692 issues unique identification information for each of the plurality of wireless communication devices 10*m* with which the connection process is completed. Then, the identification information issuing unit 692 transmits the issued pieces of identification information to the plurality of wireless communication devices 10*m*, respectively (step S504).

The terminal display processing unit 91 causes the terminal display unit 71 to display, in a list, the identification information of each wireless communication device 10*m* that is issued by the identification information issuing unit 692 (step S105). Furthermore, each wireless communication device 10*m* displays, on the display unit 20, the identification information that is transmitted from the terminal display processing unit 91 (step S106).

Next, the user specifies one wireless communication device 10*m* through an operation such as touching on the identification information that the user selected from the pieces of identification information displayed in a list on the display/input unit 70 of the information terminal device 60 (step S107). Then, the terminal display processing unit 91 inputs a signal according to the operation of the user from the terminal input unit 72, and causes the display/input unit 70 to display the authentication screen (step S108).

Next, the user inputs, on the authentication screen of the display/input unit 70, the authentication data that is displayed on the display unit 20 of the wireless communication device 10*m* that is desired to be operated (step S109). Then, the terminal display processing unit 91 transmits the input authentication data to the authentication data issuing unit 52 of the wireless communication device 10*m* (step S110). Then, the authentication data issuing unit 52 transmits a permission signal to the terminal display processing unit 91, in the case where the authentication data that is transmitted from the terminal display processing unit 91 and the authentication data issued by the authentication data issuing unit 52 coincide with each other. The one wireless communication device 10*m* and the information terminal device 660 are thereby placed in a state where data communication may be performed (step S111). Moreover, the information terminal device 660 disconnects the wireless communication device 10*m* that is not specified in step S107 (step S112). Then, the wireless communication system 100 starts data communication between the wireless communication device 10*m* specified in step S107 and the information terminal device 660 (step S113).

As described above, with the wireless communication system 100 of Embodiment 7, as in Embodiment 1, the user can easily specify the wireless communication device with which data communication is desired to be performed, from a plurality of wireless communication devices 10. Moreover, with the wireless communication system 100 of Embodiment 7, whether the device identification data of a remote control for operating an air-conditioning apparatus includes the target characteristic information or not is determined, and the terminal display unit 71 is caused to display only the identification information of the wireless communication device 10 of which the device identification data includes the target characteristic information. More specifically, in the case where wireless communication is to be performed by Bluetooth, for example, target devices that can perform Bluetooth connection are limited, at the time point of display of the identification information of the wireless communication devices 10, to remote controls for specific air-conditioning apparatuses associated with the remote operation program. In other words, in the case where the wireless communication device 10 is not associated with the remote operation program, the information terminal device 660 may remove the wireless communication device 10 from the targets of list display even if the wireless communication device 10 includes the Bluetooth connection function. In this manner, in Embodiment 7, the identification information of the wireless communication device 10 other than the display target device does not have to be displayed, and the amount of information that is displayed on the terminal display unit 71 may be reduced, and the visibility and the ease of operation may be increased.

The characteristic configuration of each of Embodiments 2 to 6 described above may be applied to the wireless communication system 100 of Embodiment 7. For example, in the case where the configuration of Embodiment 2 is applied, the terminal controller 690 does not include the identification information issuing unit 692. The information terminal device 660 acquires the identification information that is issued by the identification information issuing unit 192, by performing a connection process for the wireless communication device 10 that is compatible with the remote operation program. In the case where the configurations of Embodiments 5 and 6 are applied, list display may be performed by taking into account the field intensity of the wireless communication device 10, and moreover, a connection process may be performed without selection, based on the field intensity, of the identification information to be displayed, or without display of the identification information. In other words, the communication device selection unit 696 may be configured to include the target extraction function of extracting the wireless communication device of which the device identification data includes the target characteristic information, and to select at least one wireless communication device from the extracted wireless communication devices based on the field intensity. In other words, when the remote operation program is installed and stored in the terminal storage unit 93, the target extraction function may be implemented by the communication device selection unit 696.

Each embodiment described above is a preferred embodiment of the wireless communication system, and the technical scope of the present invention is not limited to these embodiments. For example, Embodiment 3 describes a case where the light-emitting unit 220 is included, and Embodiment 4 describes a case where the notification unit 320 is included, but such cases are not restrictive, and the wireless communication device 210 of Embodiment 3 may further include the notification unit 320 and the notification processing unit 56. Moreover, the wireless communication device 10 of Embodiment 1 or the wireless communication device 110 of Embodiment 2 may include at least the light-emitting unit 220 and the light-emission processing unit 55, or the notification unit 320 and the notification processing unit 56.

Information on a wireless communication device with which a connection process is not desired to be performed may be registered in advance in the terminal storage unit 93. A wireless communication device by which a connection process is not desired to be performed is a wireless communication device that is installed in an adjacent room, for example. The information terminal device may refer to the terminal storage unit 93, and may prevent the identification information of a wireless communication device by which a connection process is not desired to be performed from being displayed on the terminal display unit 71, even when the wireless communication device is present within the searchable range. The number of pieces of identification information to choose from may thereby be reduced, and the distinguishability of each piece of identification information on the terminal display unit 71 may be enhanced, and the user is enabled to easily specify a wireless communication device.

In Embodiments 5 and 6, at least one of rearrangement of pieces of identification information according to the field intensity, and selection of identification information according to the field intensity is performed. Accordingly, the information terminal device may be configured without including the identification information issuing unit. In other words, a part excluding the characteristic information of the device identification data may be used as the identification information, for example. Also in this case, the visibility may be increased as compared with a conventional configuration. Furthermore, in the case of the configuration of Modification 6-1 of Embodiment 6 described above, only one piece of identification information is displayed, and thus, simple and unique identification information may not necessarily be issued. Accordingly, a part excluding the characteristic information of the device identification data may be used as the identification information, for example. In the case of using the device identification data as the identification information, the user may change a part "*" of the device identification data having a format such as "ACR-*" to information indicating a location such as "floor A" or "floor B", for example. With the configurations of Modification 6-2 and Modification 6-3 of Embodiment 6, the identification information may not necessarily be issued in the first place, but it is also possible to display the identification information as necessary and to set the identification information to be changeable.

Furthermore, each embodiment described above describes a case where the display unit 20 is a liquid crystal display, but such a case is not restrictive, and the display unit 20 may be a 7-segment display that uses LEDs, or an indicator lamp, for example. Moreover, in each embodiment, the display unit 20 and the input unit 30 are separately provided, but such a case is not restrictive, and the wireless communication device may include a touch panel including the function of the display unit 20 and the function of the input unit 30. Moreover, each embodiment described above describes a case where the information terminal device includes the display/input unit 70 including a touch panel, but such a case is not restrictive. The information terminal device may include, instead of the display/input unit 70, a display unit including a liquid crystal display panel, and an input unit including a plurality of physical buttons, the input unit being configured to receive an input operation of the user.

Each embodiment described above describes a case where the wireless communication device performs communication with the air-conditioning apparatus 200 through a cable, but such a case is not restrictive, and the wireless communication device may perform communication with the air-conditioning apparatus 200 by an arbitrary communication standard such as Bluetooth, a wireless LAN such as WiFi, or ZigBee.

Each embodiment described above describes a case where the wireless communication device is a remote control for operating an air-conditioning apparatus, but such a case is not restrictive, and the wireless communication device may be a remote control for operating lighting equipment such as a ceiling light, for example. In this case, the lighting equipment corresponds to "facility equipment" of the present invention.

The invention claimed is:
1. A wireless communication system comprising:
  a plurality of wireless communication devices each including a display; and
  an information terminal device configured to perform wireless communication with each of the plurality of wireless communication devices,
  wherein the information terminal device includes
    a field intensity calculator configured to determine a field intensity of each of the plurality of wireless communication devices,
    a communication device selector configured to select at least one wireless communication device of the plurality of wireless communication devices based on each field intensity determined by the field intensity calculator,
    a terminal display configured to display identification information of the at least one wireless communication device selected by the communication device selector,
    a terminal inputter configured to receive a selection operation of selecting identification information displayed on the terminal display and an operation to specify one wireless communication device based on the identification information displayed on the terminal display, and
    a terminal wireless communicator configured to perform data communication with the wireless communication device specified on the terminal inputter, wherein
  the plurality of the wireless communication devices each includes a light emitter configured to emit light when the selection operation is received by the terminal inputter,
  the plurality of wireless communication devices are each a remote control configured to operate facility equipment of a same type, and each includes an authentication data issuer for issuing authentication data used for determining whether to permit or reject operation of the facility equipment by the information terminal device, and the display displays the authentication data together with the identification information, the authentication data being issued by the authentication data issuer.

2. The wireless communication system of claim 1, wherein
the communication device selector selects the wireless communication system by using a result of comparison of field intensities of the plurality of the wireless communication devices installed within the searchable range, and
the plurality of the wireless communication devices each causes the light emitter inside when selected in the communication device selector.

3. The wireless communication system of claim 1, wherein
the plurality of wireless communication devices each includes a notifier configured to output a sound when the selection operation is received by the terminal inputter.

4. The wireless communication system of claim 1, wherein
the display is caused to emit light when the selection operation is received by the terminal inputter of each of the plurality of wireless communication devices.

5. The wireless communication system of claim 1, wherein, when a plurality of the wireless communication devices are selected by the communication device selector, the terminal display displays the identification information in a descending order from the identification information of the wireless communication device with a large field intensity.

6. The wireless communication system of claim 1, wherein the communication device selector selects the wireless communication device with a largest field intensity among the plurality of wireless communication devices.

7. The wireless communication system of claim 1, wherein
the plurality of wireless communication devices are each configured to sequentially store history data that is information on a history of connection to the information terminal device, and
the communication device selector is configured to extract the wireless communication device, with which connection is previously made, by referring to the history data of each of the plurality of wireless communication devices and to select, when a plurality of the wireless communication devices are extracted, the wireless communication device with a largest field intensity among the plurality of wireless communication devices.

8. The wireless communication system of claim 6, wherein
the terminal inputter is configured to receive a rejection operation of rejecting specification of the wireless communication device selected by the communication device selector, and
the communication device selector is configured to select, when the rejection operation is received by the terminal inputter, the wireless communication device of which the field intensity is next largest to the field intensity of the wireless communication device that is selected immediately previously.

9. The wireless communication system of claim 6, wherein the plurality of wireless communication devices each causes the light emitter to emit light when selected by the communication device selector.

10. The wireless communication system of claim 6, wherein the plurality of wireless communication devices each includes a notifier configured to output a sound when selected by the communication device selector.

11. The wireless communication system of claim 6, wherein the display emits light when the wireless communication device to which the display belongs is selected by the communication device selector.

12. The wireless communication system of claim 1, wherein
the information terminal device includes an identification information issuer for issuing the identification information, that is unique, for at least one wireless communication device selected by the communication device selector, and transmits, to the at least one wireless communication device selected by the communication device section unit, via the terminal wireless communicator, the identification information that is issued, and
the display displays the identification information issued by the identification information issuer.

13. The wireless communication system of claim 1, wherein
the plurality of wireless communication devices each includes an identification information issuer configured to issue the identification information that is unique, and
the display unit displays the identification information issued by the identification information issuer.

14. The wireless communication system of claim 12, wherein the identification information issuer issues the identification information that is associated with the field intensity of the wireless communication device.

15. The wireless communication system of claim 12, wherein the identification information issuer issues, as the identification information, a simple ID made up of three or less letters including at least one of alphabet letters or numbers.

16. The wireless communication system of claim 1, wherein the display displays the authentication data, when the wireless communication device to which the display belongs is specified on the terminal inputter.

17. The wireless communication system of claim 1, wherein the terminal display displays, in association with the identification information, field intensity data indicating a level of the field intensity of the wireless communication device.

18. The wireless communication system of claim 1, wherein
the plurality of wireless communication devices each includes device identification data including characteristic information that is common to a same type, and
the communication device selector is configured to extract target wireless communication devices including the device identification data that includes the characteristic information indicating that the wireless communication devices are targets of the data communication, and to select at least one wireless communication device from the extracted wireless communication devices.

19. The wireless communication system of claim 18, wherein
the information terminal device includes a terminal storage storing a remote operation program, and the communication device selector implements the target extraction function by operating according to the remote operation program.

20. A wireless communication system comprising:
a plurality of wireless communication devices each including a display; and
an information terminal device configured to perform wireless communication with each of the plurality of wireless communication devices,
wherein the information terminal device includes
a field intensity calculator configured to determine a field intensity of each of the plurality of wireless communication devices,
a communication device selector configured to select at least one wireless communication device of the plurality of wireless communication devices based on each field intensity determined by the field intensity calculator,
a terminal display configured to display identification information of the at least one wireless communication device selected by the communication device selector,
a terminal inputter configured to specify one wireless communication device based on the identification information displayed on the terminal display, and
a terminal wireless communicator configured to perform data communication with the wireless communication device specified on the terminal inputter,
wherein the communication device selector selects the wireless communication device with a largest field intensity among the plurality of wireless communication devices,
the terminal inputter is configured to receive a rejection operation of rejecting specification of the wireless communication device selected by the communication selector, and
the communication device selector is configured to select, when the rejection operation is received by the terminal inputter, the wireless communication device, of which the field intensity is next largest to the field intensity of the wireless communication device that is selected immediately previously.

21. A wireless communication system comprising:
a plurality of wireless communication devices each including a display; and
an information terminal device configured to perform wireless communication with each of the plurality of wireless communication devices,
wherein the information terminal device includes
a field intensity calculator configured to determine a field intensity of each of the plurality of wireless communication devices,
a communication device selector configured to select at least one wireless communication device of the plurality of wireless communication devices based on each field intensity determined by the field intensity calculator,
a terminal display configured to display identification information of the at least one wireless communication device selected by the communication device selector,
a terminal inputter configured to specify one wireless communication device based on the identification information displayed on the terminal display, and
a terminal wireless communicator configured to perform data communication with the wireless communication device specified on the terminal inputter,
wherein the plurality of wireless communication devices each is configured to sequentially store history data that is information on a history of connection to the information terminal device,
the communication device selector is configured to extract the wireless communication device with which connection is previously made by referring to the history data of each of the plurality of wireless communication devices and of extracting, and to select, when a plurality of the wireless communication devices are extracted, the wireless communication device with a largest field intensity among the plurality of wireless communication devices,
the terminal inputter is configured to receive a rejection operation of rejecting specification of the wireless communication device selected by the communication device selector, and
the communication device selector is configured to select, when the rejection operation is received by the terminal inputter, the wireless communication device, of which the field intensity is next largest to the field intensity of the wireless communication device that is selected immediately previously.

* * * * *